(12) United States Patent
Thiebeauld de la Crouee et al.

(10) Patent No.: US 10,419,206 B2
(45) Date of Patent: Sep. 17, 2019

(54) METHOD OF TESTING THE RESISTANCE OF A CIRCUIT TO A SIDE CHANNEL ANALYSIS OF SECOND ORDER OR MORE

(71) Applicant: ESHARD, Martillac (FR)

(72) Inventors: Hugues Thiebeauld de la Crouee, Pessac (FR); Georges Gagnerot, Marseilles (FR)

(73) Assignee: ESHARD, Martillac (FR)

( * ) Notice: Subject to any disclaimer, the term of this patent is extended or adjusted under 35 U.S.C. 154(b) by 250 days.

(21) Appl. No.: 15/439,578

(22) Filed: Feb. 22, 2017

(65) Prior Publication Data

US 2017/0244549 A1 Aug. 24, 2017

(30) Foreign Application Priority Data

Feb. 22, 2016 (FR) ...................................... 16 51443
Feb. 22, 2016 (FR) ...................................... 16 51444
Feb. 22, 2016 (FR) ...................................... 16 51445

(51) Int. Cl.
*H04L 29/06* (2006.01)
*H04L 9/00* (2006.01)
(Continued)

(52) U.S. Cl.
CPC ........ *H04L 9/003* (2013.01); *G01R 31/31719* (2013.01); *G06F 21/72* (2013.01);
(Continued)

(58) Field of Classification Search
CPC ....... H04L 9/003; H04L 9/002; H04L 9/3242; H04L 9/3247; H04L 9/3249;
(Continued)

(56) References Cited

U.S. PATENT DOCUMENTS

| 2003/0223580 A1 | 12/2003 | Snell |
| 2008/0019503 A1 | 1/2008 | Dupaquis et al. |

(Continued)

FOREIGN PATENT DOCUMENTS

| EP | 1267514 A2 | 12/2002 | |
| EP | 3208788 A1 * | 8/2017 | ............. H04L 9/002 |

(Continued)

OTHER PUBLICATIONS

European Search Report for International Application 17156286.1, dated Aug. 22, 2017, 5 pages.

(Continued)

*Primary Examiner* — Sarah Su
(74) *Attorney, Agent, or Firm* — Brake Hughes Bellermann LLP

(57) ABSTRACT

A test method of a circuit, comprising, acquiring value sets including values of a physical quantity or of logic signals, linked to the activity of a circuit to be tested when the circuit executes an operation of an operation set of distinct cryptographic operations applied to a same secret data, selecting at least two subsets of values in each value set, for each value set and each value subset, counting occurrence numbers of values of the subset, for each value set, forming all possible n-tuples associating together one of the occurrence numbers of each value subset of the value set, and computing a combined occurrence number for each n-tuple of the value set, to form an occurrence number set for the value set, and analyzing the occurrence number sets to determine the part of the secret data.

25 Claims, 10 Drawing Sheets

(51) Int. Cl.

| | |
|---|---|
| *G01R 31/317* | (2006.01) |
| *G09C 1/00* | (2006.01) |
| *G06F 21/72* | (2013.01) |
| *H04L 9/32* | (2006.01) |
| *G06F 21/75* | (2013.01) |

(52) U.S. Cl.
CPC ............... *G09C 1/00* (2013.01); *H04L 9/002* (2013.01); *H04L 9/3242* (2013.01); *H04L 9/3247* (2013.01); *H04L 9/3249* (2013.01); *H04L 9/3252* (2013.01); *G06F 21/75* (2013.01); *H04L 2209/08* (2013.01); *H04L 2209/12* (2013.01)

(58) Field of Classification Search
CPC ............... H04L 9/3252; H04L 2209/08; H04L 2209/12; G01R 31/31719; G06F 21/72; G06F 21/75; G06C 1/00
See application file for complete search history.

(56) References Cited

U.S. PATENT DOCUMENTS

| | | | |
|---|---|---|---|
| 2009/0074181 A1 | 3/2009 | Pelletier | |
| 2011/0246119 A1 | 10/2011 | Feix et al. | |
| 2015/0317475 A1 | 11/2015 | Aguayo Gonzalez et al. | |
| 2016/0140340 A1* | 5/2016 | Walters | G06F 21/556 726/22 |
| 2016/0314300 A1* | 10/2016 | Sethumadhavan | G06F 21/57 |
| 2017/0244547 A1* | 8/2017 | Thiebeauld de la Crouee | H04L 9/002 |
| 2017/0244548 A1* | 8/2017 | Thiebeauld de la Crouee | H04L 9/002 |
| 2017/0244549 A1* | 8/2017 | Thiebeauld de la Crouee | H04L 9/002 |
| 2017/0244550 A1* | 8/2017 | Wurcker | H04L 9/002 |
| 2017/0244551 A1* | 8/2017 | Thiebeauld de la Crouee | H04L 9/002 |
| 2017/0244552 A1* | 8/2017 | Thiebeauld de la Crouee | H04L 9/002 |

FOREIGN PATENT DOCUMENTS

| | | |
|---|---|---|
| FR | 2873523 A1 | 1/2006 |
| FR | 2893796 A1 | 5/2007 |

OTHER PUBLICATIONS

European Search Report for International Application 17156287.9, dated Jul. 26, 2017, 7 pages.

European Search Report for International Application 17156290.3, dated Aug. 22, 2017. 4 pages.

European Search Report for International Application 17156292.9, dated Aug. 17, 2017, 4 pages.

European Search Report for International Application 17156293.7, dated Aug. 23, 2017, 4 pages.

Prouff, Emmanuel, et al., "Statistical Analysis of Second Order Differential Power Analysis", Prouff et al.; "Statistical Analysis of Second Order Differential Power Analysis"; IEEE Transactions on Computers, vol. 58, No. 6, Jun. 1, 2009, XP011250050, pp. 799-811., pp. 799-811.

Waddle, Jason, et al., "Towards Efficient Second-Order Power Analysis", Waddle et al.; "Towards Efficient Second-Order Power Analysis"; Cryptographic Hardware and Embedded Systems—CHES 2004; Springer-Verlag, Berlin/Heidelberg; Jul. 8, 2004; XP019009359; pp. 1-15., pp. 1-15.

French Search Report from FR1651443, dated Oct. 12, 2016, 2 pages.

French Search Report from FR 1651444, dated Oct. 26, 2016, 2 pages.

French Search Report from FR1651445, dated Nov. 24, 2016, 2 pages.

Agoyan, et al., Design and characterisation of an AES chip embedding countermeasures, HAL archives-ouvertes.fr (http:// hal-emse.ccsd.cnrs.fr/emse-0062440) ,Mar. 16, 2015, 22 pages.

Allibert, et al., Chicken or the Egg Computational Data Attacks or Physical Attacks, International Association for Cryptologic Research, Nov. 10, 2015, vol. 20151110: 103835, XP061019629, 26 pages.

Bouesse, et al., Path Swapping Method to Improve DPA Resistance of Quasi Delay Insensitive Asynchronous Circuits, Cryptographic Hardware and Embedded Systems—CHES 2006 Lecture Notes in Computer Science, Oct. 10, 2006, 384-398.

Feix, et al., "Defeating ISO9797-1 MAC Algo 3 by Combining Side-Channel and Brute Force Techniques", International Association for Cryptologic Research, Dept. 5, 2014, vol. 20140905:191135, XP061016892, 15 pages.

Joye, et al., Strengthening hardware AED implementations against fault attacks, IET Inf. Secur. vol. 1(3), Sep. 10, 2007, 106-110.

* cited by examiner

METHOD OF TESTING THE RESISTANCE OF A CIRCUIT TO A SIDE CHANNEL ANALYSIS OF SECOND ORDER OR MORE

CROSS REFERENCE TO RELATED APPLICATIONS

This application claims priority to French Application Numbers FR1651443, FR1651444 and FR1651445, filed Feb. 22, 2016, the disclosures of which are incorporated herein by reference.

TECHNICAL FIELD

The present disclosure relates to methods for testing a circuit, in particular a circuit designed to handle a secret data, and in particular a circuit for transforming a message by an encryption algorithm using a secret key.

The present disclosure also relates to devices implementing cryptographic algorithms, such as secure devices (smart card integrated circuits, secure elements, secured memory cards), mobile devices (mobile phones, smartphones, Internet of Things), home automation and automotive devices, and to hardware cryptographic components integrated onto mother boards of computers and other electronic and IT equipment (USB drives, TV decoders, game consoles, etc.), or the like. The present invention also relates to software including an encryption operation, provided for being executed in a secure or non-secured environment.

The present disclosure also relates to circuits implementing a cryptographic algorithm such as a ciphering algorithm like DES (Data Encryption Standard) or Triple DES, AES (Advanced Encryption Standard), RSA (Rivest, Shamir and Adleman), DSA (Digital Signature Algorithm), or ECDSA (Elliptic Curve Digital Signature Algorithm). The present disclosure also relates to circuits implementing a hashing function such as HMAC (Keyed-Hash Message Authentication Code).

BACKGROUND

Microcircuits implementing a cryptographic algorithm are equipped with a central processing unit (CPU). Some are equipped with circuits dedicated to cryptographic computing, for example a cryptographic coprocessor. These microcircuits include thousands of logic gates that switch differently according to the operations executed. These switches create short variations in current consumption, for example of a few nanoseconds that can be measured. In particular, CMOS-type integrated circuits include logic gates that only consume current when they switch, i.e. when a logic node changes to 1 or to 0. Therefore, the current consumption depends on the data handled by the central unit and on its various peripherals: memory, data flowing on the data or address bus, cryptographic coprocessor, etc.

Furthermore, certain software programs, produced in particular using encryption or obfuscation techniques, such as the "Whitebox Cryptography" technique, may integrate a secret data in such a way that it is very difficult to determine it by reverse engineering. Certain software programs may also receive a secret data from outside through a secure communication channel. Such microcircuits may be subjected to so-called side channel analysis attacks based on observing their current consumption, or their magnetic or electromagnetic radiation, or any other information that can be observed while a cryptographic algorithm is executed. Such attacks aim to discover the secret data they use, in particular their encryption keys. Frequent side channel attacks methods implement statistical analysis methods such as SPA ("Single Power Analysis"), DPA ("Differential Power Analysis"), CPA ("Correlation Power Analysis") or EMA ("ElectroMagnetic Analysis"). SPA analysis normally only requires the acquisition of a single current consumption trace. It aims to obtain information about the activity of the integrated circuit by observing the part of the consumption trace corresponding to a cryptographic computation, since the current trace varies according to the operations executed and the data handled.

Software may also undergo such side channel attacks during their execution by a circuit.

DPA and CPA analyses enable the key of an encryption algorithm to be found by acquiring numerous data or measurement traces and by statistically analyzing these traces to find the information searched for. They are based on the assumption that the consumption of a CMOS-type integrated circuit varies when a bit changes from 0 to 1 in a register or on a bus, and does not vary when a bit remains equal to 0, remains equal to 1 or changes from 1 to 0 (discharge of the stray capacitance of the MOS transistor). Alternatively, it can be considered that the consumption of a CMOS-type integrated circuit varies when a bit changes from 0 to 1 or changes from 1 to 0 and does not vary when a bit remains equal to 0 or remains equal to 1. This second hypothesis enables the conventional "Hamming distance" or "Hamming weight" functions to be used to develop a consumption model that does not require the structure of the integrated circuit to be known to be applicable. DPA analysis involves amplifying this consumption difference using statistical processing on numerous consumption traces, aiming to highlight a measurement difference between two families of consumption traces distinguished according to formulated hypotheses.

CPA analysis is based on a linear current consumption model and involves computing a correlation coefficient between, firstly, the consumption points measured that form the captured consumption traces and, secondly, an estimated consumption value, computed from the linear consumption model and a hypothesis on the variable to be discovered that is handled by the microcircuit and on the value of the encryption key.

Electromagnetic analysis (EMA) is based on the principle that a microcircuit may leak information in the form of near or far field electromagnetic radiation. Given that transistors emit electromagnetic signals when their state changes, these signals can be treated like the current consumption variation signals by an analysis such as one or other of the SPA, DPA and CPA analyses.

Other side channel attacks exist, such as "Template attacks" and "Mutual Information Analysis" (MIA). All of the above-mentioned attacks are based on a time alignment of all the analyzed traces. In other words, all the measurements performed at a given time, for example from the time the execution of a command is activated by the circuit, must correspond to the same value handled by the algorithm.

To protect such circuits and the cryptographic algorithms they execute against such side channel attacks, counter-measures are generally provided. One type of counter-measure aims to avoid such a time alignment. For this purpose, these type of counter-measures introduce variations in the clock frequency supplied to the calculation circuits, or introduce dummy clock cycles or dummy operations.

In some instances, it may be possible to restore this time alignment, through specific expertise and many attempts, e.g., using a high number of traces to be realigned and/or applying signal processing. In any event, cases remain where it is not possible to restore this time alignment, such that the side channel tests fail even though there is a secret data leakage present in the traces.

Another type of counter-measure involves executing a ciphering method several times using false keys and/or false messages (data). In such instances, a counter-measure program can be provided that, for example, controls the ciphering program or a coprocessor, and makes it execute the ciphering method several times with the false keys and/or the false data, in a random order, such that the execution of the ciphering method with the right key (e.g., the authentic key) is "hidden" in a set of dummy executions. Such counter-measures, using multiple executions, offer an advantage that they can be implemented with a conventional coprocessor that does not implement any specific counter-measures.

Another type of counter-measure involves adapting a given algorithm to be protected to render the data handled by the circuit independent of their actual values. Certain counter-measures of this type—that can be referred to as "masking-type counter-measures"—use a random mask (binary number) that is combined with another data to be protected such as the key and/or the message during the execution of the ciphering method. This type of counter-measure is effective but requires the algorithm to be modified, and thus requires a coprocessor specially provided for its implementation in the case of execution by a dedicated coprocessor, or a more complex program in the case of execution by the central processing unit of the microcircuit or a programmed coprocessor. In addition this type of counter-measure is vulnerable to so-called "second order attacks" which are based on analysis of a set of signal traces that can each be obtained by combining two parts of a respective trace. As an example, each of these signal traces combines a signal part that can include a leakage related to a data resulting from the combination of a data value to discover and a random mask value, and a signal part that can include a leakage of the random mask value. Different approaches can be used to combine time signal parts to obtain a signal trace related to the data value to discover. However, such second order attacks can be difficult to accomplish due to the requirement that the combined signal parts need to be strictly aligned in time before being combined. If this requirement is not fulfilled, the combined signal traces will not contain useful information that can be extracted by conventional statistical analyses, or, even if the combined signal traces do contain useful information, this information cannot be extracted by conventional statistical analyses. As a consequence, such second order attacks can be highly sensitive to counter-measures based on various kinds of time misalignment, such as those causing a duration of the clock cycle supplied to a circuit to vary randomly, or those introducing dummy processing cycles or operations at randomly chosen times.

To check the level of security offered by a secure integrated circuit intended to be marketed, qualification and/or certification tests are planned before the circuit is marketed, where these tests can include tests of the robustness of the integrated circuit to side channel analyses aiming to discover the secret data handled by the integrated circuit. There are also tests enabling the resistance of a software program to side channel attacks to be assessed.

SUMMARY

Some embodiments relate to a test method for a circuit, including: acquiring a plurality of value sets, each value set including values of a physical quantity or of logic signals, linked to the activity of a circuit to be tested when the circuit executes an operation of an operation set of distinct cryptographic operations applied to a same data to be discovered, selecting at least two subsets of values in each value set, for each value set and each value subset, counting by a processing unit occurrence numbers of values transformed by a respective first surjective function applied to the values of the subset of the value set, for each value set, forming n-tuples associating together one of the occurrence numbers of each of the value subsets of the value set, computing a combined occurrence number for each n-tuple of the value set by multiplying together the occurrence numbers associated by the n-tuple, and forming an occurrence number set for the value set including combined occurrence numbers computed for the value set, for each operation of the operation set, and each of the possible values of a part of the data to be discovered, computing by the processing unit a partial operation result, computing by the processing unit cumulative occurrence number sets, each cumulative occurrence number set being obtained by adding together the occurrence number sets corresponding to the operations of the operation set, which when applied to a same value or equivalent value of the possible values of the part of the data to be discovered, provide a partial operation result having a same transformed value resulting from the application of a second surjective function, and analyzing by the processing unit the cumulative occurrence number sets to determine the part of the data to be discovered, knowing that if the data to be discovered has leaked into the value sets, it is found in the cumulative occurrence number sets corresponding to the value of the part of the data to be discovered.

According to an embodiment, the method can include: transmitting to the circuit a plurality of distinct commands, each command triggering the execution by the circuit of one of the operations of the operation set, applied to the data to be discovered, and during the execution by the circuit of one operation of the operation set, collecting by a measuring device, the values of one of the value sets.

According to an embodiment, the subsets of each value set can include measurements of respective distinct signals.

According to an embodiment, the value sets can include: measurements of current consumption of the circuit, and/or measurements of electromagnetic radiation emitted by the circuit, and/or measurements of absorption of magnetic field present around the circuit, and/or logic signals or digital values collected in the circuit.

According to an embodiment, each of the first and second surjective functions can be one of the following functions: an identity function, a function providing a resultant value which is then reduced to a value corresponding to a Hamming weight, a function providing the Hamming weight of the value to which the function is applied, or a function providing a Hamming distance between a value and a preceding value to which the function is applied.

According to an embodiment, the method can include rejecting the circuit or the program executed by the circuit if the analyzing step determines the part of the data to be discovered.

According to an embodiment, computing an operation result for each of the possible values of a part of the data to be discovered, computing the sums of occurrence numbers, and analyzing the sums of occurrence numbers, can be performed for a previously determined part of the data to be discovered and another part of the data to be discovered.

According to an embodiment, the selected subsets in each value set can include: consecutive values of the value set, and/or non-consecutive values of the value set, and/or local extremum values of the value set, and/or all the values of the value set.

According to an embodiment, the operations of the operation set can include applying a single operation to the data to be discovered and to an input data of a set of input data, the single operation including at least one of the following operations: a symmetrical or asymmetrical encryption or decryption operation, a signature operation, a modular or non-modular multiplication by the data to be discovered, a logic Exclusive OR operation with the data to be discovered, a modular exponentiation operation, the data to be discovered being used as exponent, a modular reduction operation, the data to be discovered being used as modulus, a substitution operation by a value selected in a substitution table using the input value, and an operation combining a logic Exclusive OR operation with the data to be discovered and a substitution operation replacing the result of the logic operation with a value selected in a substitution table using the result of the logic operation.

According to an embodiment, the analysis of the cumulative occurrence numbers can include: for each cumulative occurrence numbers, computing a normalized sum by dividing the cumulative occurrence numbers by a corresponding number of occurrence numbers accumulated in the cumulative occurrence number, for each possible value of the part of the data to be discovered and each possible value of the transformed partial result, computing a sum of squared differences, between each normalized cumulative occurrence number corresponding to the possible value of the part of the data to be discovered and the possible value of the transformed partial result, and an average value of the cumulative occurrence numbers, divided by a number of operations, for each possible value of the part of the data to be discovered, computing a cumulative total of difference sums corresponding to the possible values of the transformed partial results, and comparing with each other the cumulative totals of difference sums, and detecting whether a cumulative total of difference sums for a possible value of the part of the data to be discovered is greater than the other cumulative totals of difference sums.

According to an embodiment, the analysis of the sums of occurrence numbers can include: for each possible value of the part of the data to be discovered and each possible value of the transformed partial result, computing a cumulative total of the sums of occurrence numbers, for each cumulative occurrence numbers, computing a normalized cumulative total by dividing the cumulative occurrence numbers by the corresponding cumulative total, and computing the product of the normalized cumulative total by the logarithm of the normalized cumulative total, for each possible value of the part of the data to be discovered and each possible value of the transformed partial result, computing a sum of the products corresponding to the possible value of the part of the data to be discovered and the possible value of the transformed partial result, for each possible value of the part of the data to be discovered, computing a cumulative total of the product sums corresponding to the possible values of the transformed partial results, each product sum being multiplied by a corresponding number of sums of occurrence numbers, and comparing with each other the cumulative totals of product sums, and detecting whether one of the cumulative totals of product sums for a possible value of the part of the data to be discovered is greater than the other cumulative totals of product sums.

Embodiments may also relate to a system for testing a circuit, the system including: a measuring device configured to acquire a plurality of value sets, each value set including values of a physical quantity or of logic signals, linked to the activity of a circuit to be tested during the execution by the circuit of an operation of an operation set of distinct cryptographic operations applied to a same data to be discovered, and a processing unit configured to implement the previously described methods.

According to an embodiment, the system can further include a measuring probe coupled to the measuring device for acquiring traces linked to the activity of the circuit.

According to an embodiment, the system can further include an emulator executing an application to be tested.

Embodiments may also relate to a computer program product loadable into an internal memory of a computer and including code portions which, when executed by a computer, configure the computer to carry out the steps of the previously described methods.

BRIEF DESCRIPTION OF THE DRAWINGS

Examples of embodiments are provided for illustration purposes only, and are described below in relation with, but not limited to, the accompanying figures, in which.

DETAILED DESCRIPTION

In view of the drawbacks and considerations noted above, it may be desirable to have an approach for testing the resistance of a circuit or software program to second order side channel attacks, that can detect secret data leakage without requiring any prior time alignment processing of current consumption traces, or of any other physical or logic quantity that is representative of the circuit's activity. It may also be desirable for this method to be able to test the robustness of a software program or an application, independently of the circuit in which it is executed.

It may also be desirable for such testing approaches to be integrated into (included in, implemented in, etc.) an industrial qualification and/or certification process to check the robustness of circuits or software executed by a given circuit to side channel analyses and their susceptibility to information leakage.

It may also be desirable to propose counter-measure means enabling an integrated circuit or a software program to be considered capable of being used in a product, after a qualification and/or certification process including test methods such as those described herein.

Figure 1:
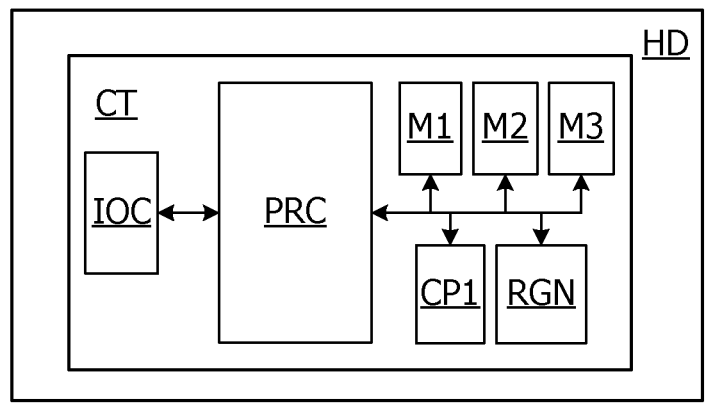
FIG. 1 schematically illustrates a conventional architecture of a secure circuit, FIG. 2 schematically illustrates an example of an integrated circuit testing system.

FIG. 1 illustrates, as an example, a secure integrated circuit CT, for example arranged on a portable medium HD such as a plastic card or any other medium, or in a terminal such as a mobile terminal. The integrated circuit of this example includes a microprocessor PRC, an input/output circuit IOC, memories M1, M2, M3 coupled to the microprocessor by a data and address bus and, optionally, a cryptographic computation coprocessor CP1 or arithmetic accelerator, and a random number generator RGN. The memory M1 is a RAM-type ("Random Access Memory") memory containing volatile application data. The memory M2 is a non-volatile memory, for example an EEPROM or Flash memory, containing non-volatile data and application programs. The memory M3 is a read-only memory (or ROM memory) containing the operating system of the microprocessor.

The communication interface circuit IOC may be of contact type, for example according to the ISO/IEC 7816 standard, of contactless type with inductive coupling, for example according to the ISO/IEC 14443A/B or ISO/IEC 13693 standard, of contactless type by electrical coupling (UHF interface circuit), or of both contact and contactless type. The interface circuit IOC may also be coupled through a specific interface, to another circuit such as an NFC (Near-Field Communications) controller, or a main circuit of a terminal such as a mobile terminal or a connected object.

In some embodiments, the integrated circuit CT may be configured to execute operations of ciphering, deciphering or signing of messages that are sent to it, by means of an encryption function. This encryption function may be executed by the processor PRC of the circuit CT or partially or totally carried out by the processor PRC to the coprocessor CP1.

Figure 2:
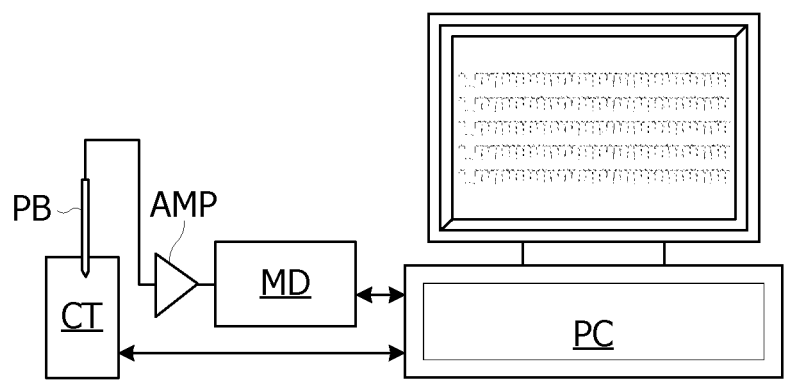

FIG. 2 illustrates an example of an integrated circuit testing system provided to implement the test method, according to one embodiment. It will be assumed, as an example, that the testing system is configured to test the integrated circuit CT in FIG. 1.

The testing system of FIG. 2 includes a measuring probe PB coupled to a measuring device MD such as a digital oscilloscope, to acquire traces related to the activity of the circuit, such as traces of current consumption or of electromagnetic signal variation, and a computing device, such as a personal computer PC. The computer PC is coupled to the measuring device and implements a test program. This test program includes a communication interface and a program for communicating with the integrated circuit and for sending it messages, a signal processing program and a program for implementing computation steps of a method, such as the methods described herein. Steps, as used herein, can refer to operations, functions, processes, etc. In the event that the integrated circuit is a contactless circuit, the communication interface may include a contactless card reader.

The probe PB may be a current probe (for example, a resistor placed on the supply terminal Vcc of the integrated circuit), or an electromagnetic probe coupled to the measuring device by a signal amplifier AMP. Alternatively, a current probe may be combined with an electromagnetic probe. The study of electromagnetic radiation indeed shows that an electromagnetic field emitted by a circuit in operation gives information about bit switches in the integrated circuit, just like the measurement of the consumed current. The advantage of an electromagnetic probe is that it may be placed near the part of the circuit whose operation needs to be analyzed (for example near the core of the microprocessor PRC or of the cryptographic computation coprocessor CP1).

Furthermore, in the case of a contactless integrated circuit, the current probe can be replaced with an inductive probe that measures the absorption, by the integrated circuit, of the magnetic field emitted by the reader. Such an inductive probe, for example an antenna coil, can itself be combined with an electromagnetic field probe placed near the circuit zones to be studied.

Therefore, in the present application, the phrase "current consumption", used for the sake of simplifying the language, can refer to any measurable physical quantity of which the variations over time are representative of the switches of binary data inside the integrated circuit or inside the studied part of the integrated circuit, the physical quantity being able to be measured at the terminals of the integrated circuit or near the studied part of the integrated circuit. Furthermore, the physical quantity is sampled with a sampling frequency sufficiently high to collect several points per data period of interest, which, in practice, can result in traces containing from 10 to a few hundred thousand points per trace, but it may be considered to collect up to several million values, or even more per trace.

The present disclosure also relates to a method for testing a software program or an application. In this case, the software program may be executed directly by the testing system or by an emulation program executed by the testing system. The analyzed traces may thus, for example, be a series of values transmitted to a memory when accessing a memory or data handled in registers of the circuit, or can be data transmitted to a communication interface of the circuit, where these transmissions can be controlled by the tested software program.

Some embodiments of a test method can be based on a detailed review of traces of variation over time of signals or digital values, representative of the operation of the circuit to be tested while it executes an operation applied to a data to be discovered, called in the following "secret data".

Figure 3:
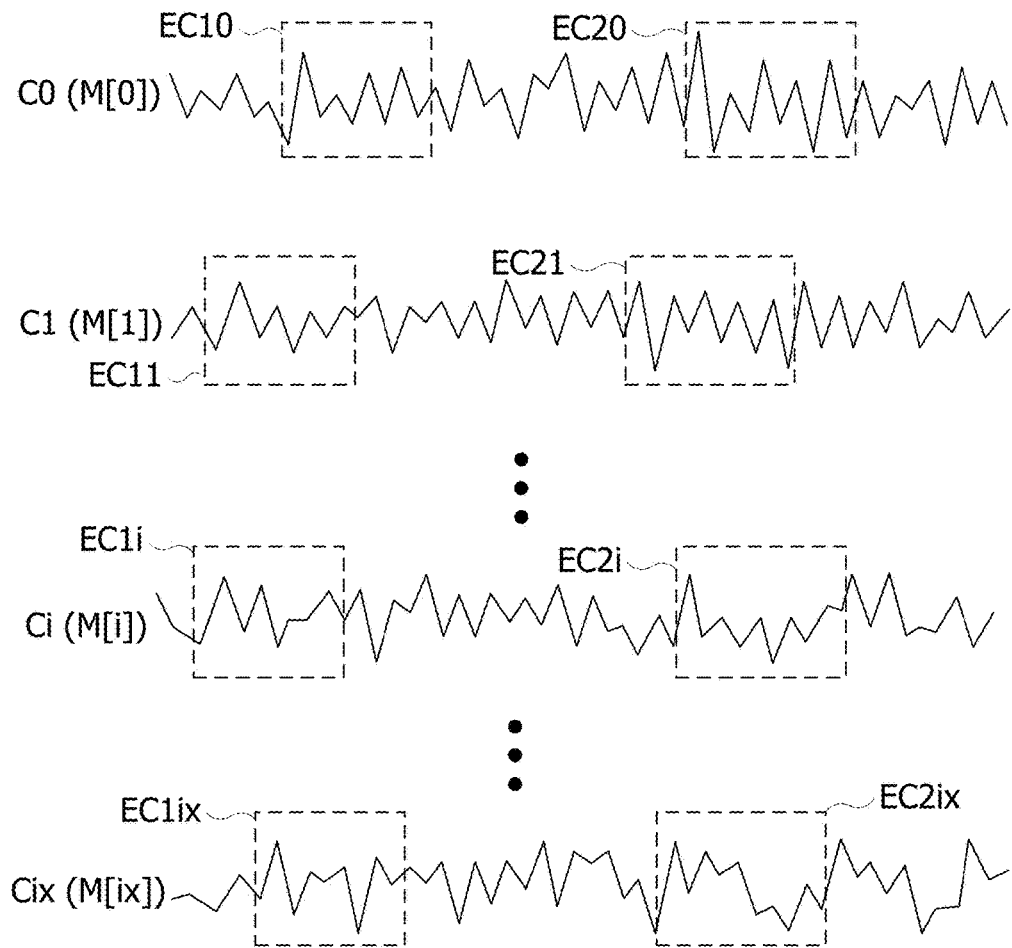
FIG. 3 illustrates traces of a signal acquired during the execution of an encryption operation by a secure circuit.

FIG. 3 illustrates traces C0, C1, ... Cix of values over time, that can be acquired by a testing system. Each of these traces can be obtained by causing an operation to be executed by the circuit or the software program to be tested. The operations corresponding to the traces C0, C1, ... Cix are generally all different. These operations are different for example because they involve applying a same function to distinct known input data, for example messages to be ciphered, deciphered or signed or a signature to be checked, or a HMAC (keyed-Hash Message Authentication Code) to be computed. Alternatively, the known data may be output data of the function, or a part of the input and output data of this function, rather than input data thereof.

The function may be any function applied to a same secret data SD, and to an input data M, such as a symmetrical or asymmetrical ciphering or deciphering operation, or even a signature operation, or merely a modular or non-modular multiplication, by the secret data (M×SD), a logic XOR function (Exclusive OR) with the secret data (M XOR SD), a modular exponentiation function, the secret data being used as exponent (MSD mod n, n being known), or a modular reduction function, the secret data being used as the modulus (M mod SD). Another example of a function involves processing the result of an XOR operation with a substitution table (SBOX[M XOR SD], SBOX being the substitution table), as in the case of the DES and AES cryptographic algorithms. More generally, this function must enable a part of the value resulting from the operation to be computed based on a part of the secret data and an input data.

In the example of FIG. 3, the traces C0, C1, ... Ci, ... Cix respectively correspond to the input (or output) data M[0], M[1], ... M[i], ... M[ix]. Each of the traces Ci can be formed of samples acquired from a same signal measured on a same circuit under test, or can include samples from different signals, captured when the circuit under test manipulates the data M[i].

Figure 4A:
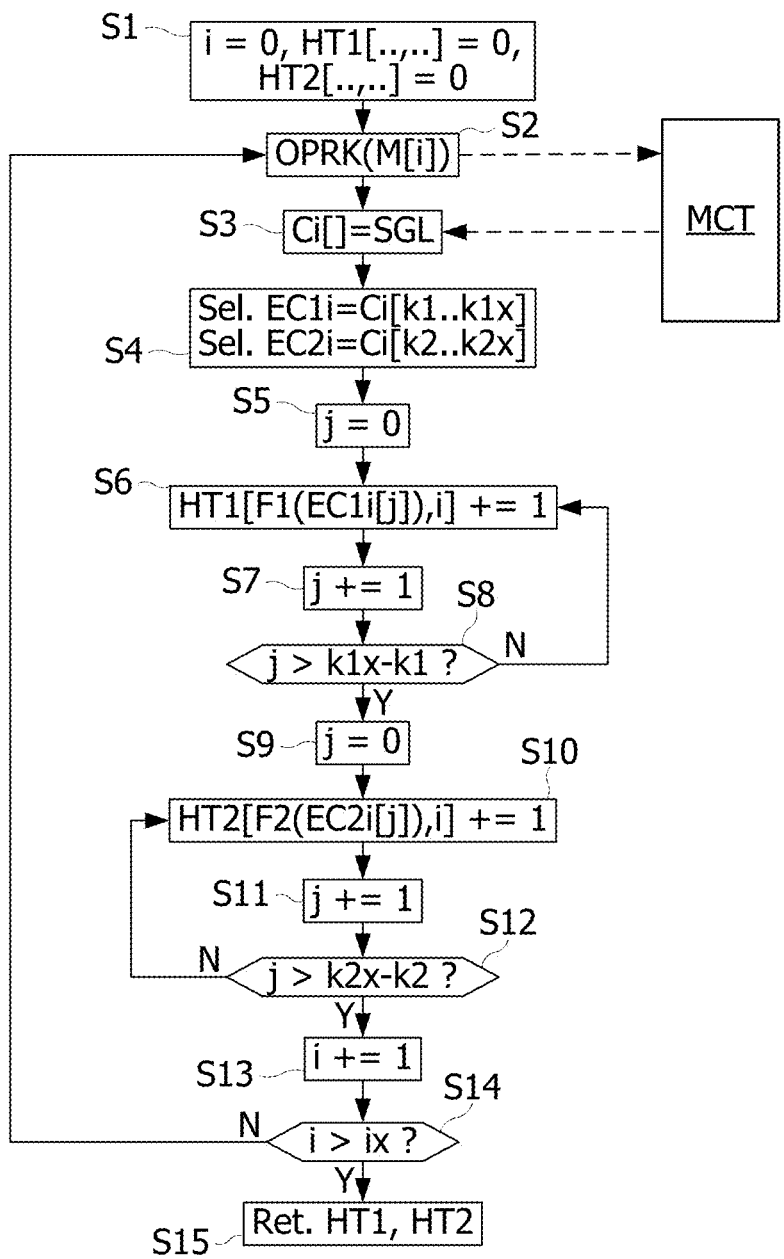
FIGS. 4A, 4B illustrate a method for testing a secure circuit, according to one embodiment.

FIG. 4A illustrates steps (operations, functions, processes, etc.) S1 to S15 of processing the values collected by a testing system during the execution of an encryption operation OPRK assumed to be known, applied to a secret data to be discovered, and to input data M[0] ... M[ix] also known. According to one embodiment, the aim of this test is to determine whether the value of the secret data leaks into (e.g., can be determined from) the collected values forming the traces of FIG. 3, for example. The processing unit PC first executes steps S1 to S8.

In step S1, the processing unit PC of the testing system sets an index i of a loop on the input data M[0] ... M[ix], as well as two-dimensional tables HT1, HT2 to 0. In step S2, the processing unit PC activates the execution of an operation OPRK by the circuit MCT or the software program to be tested, this operation receiving the data M[i], the secret data being provided to the operation by the circuit MCT or the software program. In step S3, the processing unit PC collects the values constituting the trace Ci. In step S4, parts EC1$i$, EC2$i$ of the values of the trace Ci are selected (FIG. 3), with only these parts being processed in the following processing steps. In the example of FIG. 4A, the parts EC1$i$, EC2$i$ are delimited by the values of the trace Ci corresponding to the indices k1 and k1$x$ for the part EC1$i$, and k2 and k2$x$ for the part EC2$i$, for the sake of simplicity. In embodiments, the indices k1, k1$x$, k2 and k2$x$ may vary from one trace Ci to the next. In addition, the values selected in each trace are not necessarily consecutive, and the number of values in each part EC1$i$, EC2$i$ may be different from one another in each trace Ci and may vary from one trace Ci to the next, in contrast with prior side-channel analyses. Thus, it may be decided, for example, to extract only maximum or minimum local values from each trace Ci. It is noted that the extracted parts EC1$i$, EC2$i$ may include the entire trace Ci. In the following processing, the data thus extracted are assumed to contain a piece of information concerning the secret data that is being searched for. Each trace Ci (i=0 ... ix) can include sample values from different signals acquired at the same time when the circuit under test manipulates the data M[i]. In such a case, the part EC1$i$ can, for instance, include sample values extracted from a first one of these signals and the part EC2$i$ can include sample values extracted from a second one of these signals.

In step S5, the processing unit PC sets a loop index j to 0. In step S6, the processing unit PC applies a surjective function F1 to the point value EC1$i$[$j$] of index $j$ of the selected point set EC1$i$ and increments by one (1) a value in the table HT1[$i$], designated by an index equal to the result provided by the function F1 and by the index i. In step S7, the index j is incremented by one (1). In step S8, the index j is compared with its maximum value (k1$x$−k1) corresponding to the number of points in the point set EC1$i$, to determine whether all the values of the point set EC1$i$ have thus been processed. Once all the values of the point set EC1$i$ have been processed, the processing unit PC executes the steps S9 to S12, otherwise it executes the steps S6 to S8 again. Steps S9 to S12 are provided to process the point set EC2$i$ in a similar way as steps S5 to S8, which process the point set EC1$i$. In step S9, the processing unit PC sets the loop index j to 0. In step 10 the processing unit PC applies a surjective function F2 to the point value EC2$i$[$j$] of index j in the selected point set EC2$i$ and increments by one (1) a value in the table HT2[$i$], designated by an index equal to the result provided by the function F2, and by the index i. In step S11, the index j is incremented by one (1). In step S12, the index j is compared with its maximum value (k2$x$−k2) corresponding to the number of points in the point set EC2$i$, to determine whether all the values of the point set EC2$i$ have thus been processed. Once all the values of the point set EC2$i$ have been processed, the processing unit PC executes the steps S13 and S14, otherwise it executes the steps S10 to S12 again. In step S13, index i is incremented by one (1). In step S14, index i is compared with its maximum value ix corresponding to the number of traces Ci to be analyzed. Once all the traces Ci have been processed, the processing unit PC executes step S15, otherwise it executes the steps S2 to S14 again to process another trace Ci. In step S15, the tables HT1, HT2 are returned as result of the steps S1 to S14.

In this way, the values of the point sets EC1$i$, EC2$i$ recorded in each of the tables HT1[$i$], HT2[$i$] for one trace Ci can have the form of a histogram specifying the occurrence number of each possible value returned by the function F1 or F2. Hence, the time feature related to the values of the point sets EC1$i$, EC2$i$ is not included in the tables HT1[$i$], HT2[$i$]: the content of the tables HT1[$i$], HT2[$i$] does not allow the order in which the values of the point set EC1$i$, EC2$i$ have been collected to be determined. The functions F1, F2 can be the same or different from one another.

Figure 5:
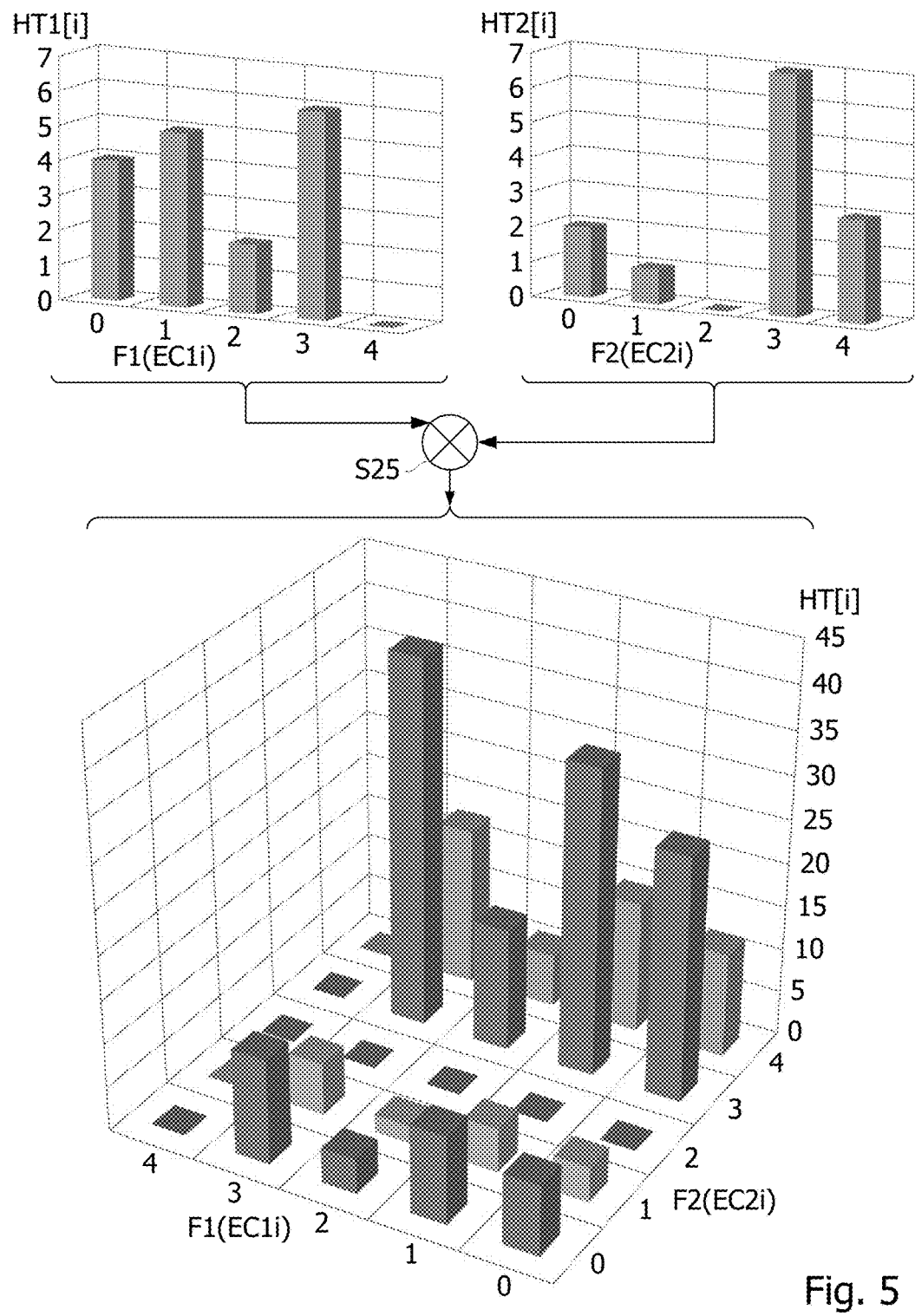
FIG. 5 illustrates histograms computed to perform statistical processing, according to one embodiment, FIG. 6 schematically illustrates a table built to perform statistical processing according to one embodiment.

FIG. 5 illustrates an example of tables HT1, HT2 in the form of a graph of occurrence numbers (in the y axis) of values (in the x axis) computed using the functions F1, F2. In the example of FIG. 5, the functions F1, F2 return an integer value between 0 and 4. For the steps S6 to S8 counted in the point set EC1$i$: four values equal to 0, five values equal to 1, two values equal to 2, six values equal to 3 and no value equal to 4. For the steps S10 to S12 counted in the point set EC2$i$: two values equal to 0, one value equal to 1, no value equal to 2, seven values equal to 3 and three values equal to 4. In the example of FIG. 5, the functions F1 and F2 return the Hamming weight computed from 4-bit encoded values.

Figure 4B:
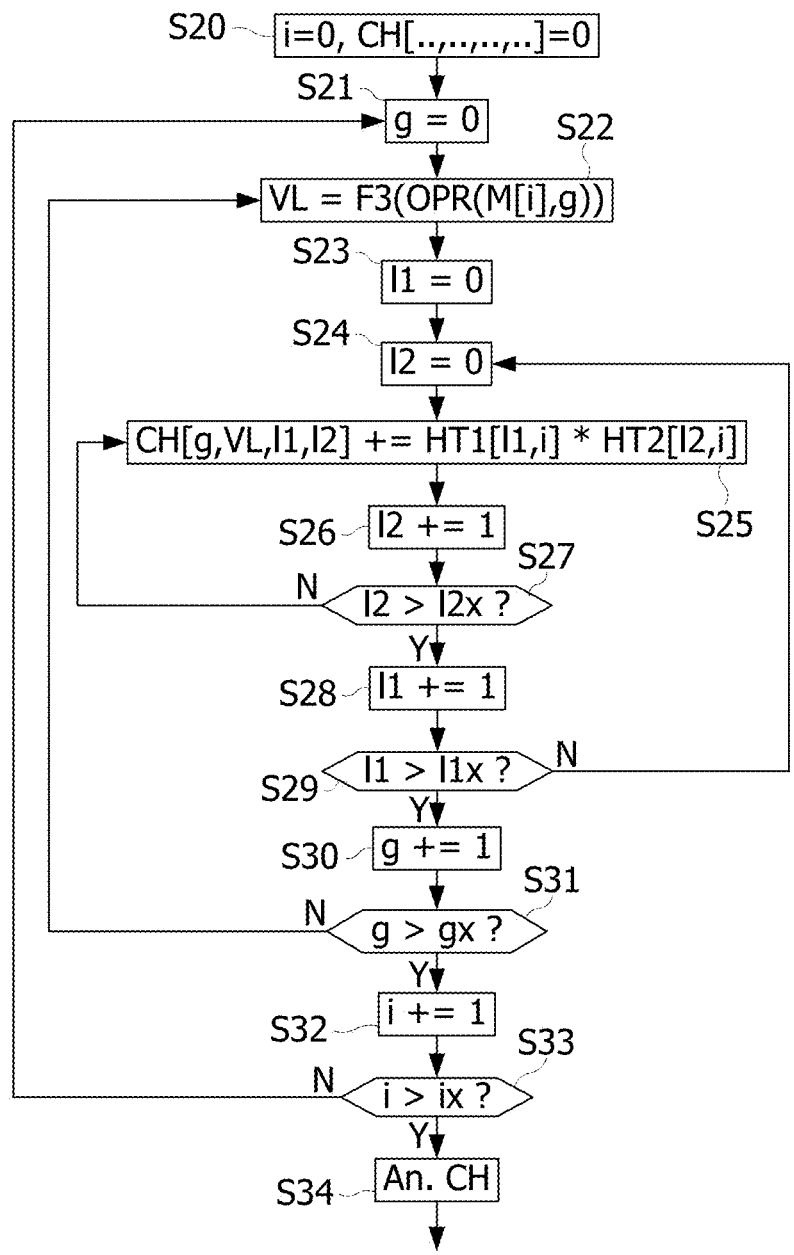

FIG. 4B illustrates steps (operations, functions, processes, etc.) S20 to S35 of processing the tables HT1, HT2. In an embodiment, the processing unit PC can first execute steps S20 to S27. In this example, at step S20, the processing unit PC sets index i and a four-dimensional table CH to 0. In step S21, the processing unit PC sets an index g to 0. In step S22, the processing unit PC applies an operation OPR to the data M[i] and to a part of the secret data SD to be determined, set to be equal to the index g. The operation OPR(M, g) is intended to provide a part of the result of the operation OPRK(M) (=OPR(M, SD)) executed in step S2. The result provided by the operation OPR can be processed by a surjective function F3 that supplies a value VL. In steps S23 and S24, the processing unit PC sets, respectively, indices I1 and I2 to 0. In step S25, the processing unit PC increments a value stored in the table CH, at a location designated by the indices g, VL, I1 and I2, by the product of the value HT1[I1,$i$] at index I1 in the table HT1[$i$] corresponding to the point set EC1$i$, by the value HT2[I2,$i$] at index I2 in the table HT2[$i$] corresponding to the point set EC2$i$. In step S26, the index I1 is incremented by one (1). In step S27, the index I1 is compared with its maximum value I1$x$ considering the number of possible distinct values provided by the function F1. If the index I1 is lower than or equal to its maximum value I1$x$, steps S25 to S27 are executed again to process another value of the table HT1[i], otherwise (when index I1 is greater than its maximum value I1x), steps S28 and S29 are executed. In step S26, the index I1 is incremented by one (1). In step S28, the index I2 is compared with its maximum value I2x considering the number of possible distinct values provided by the function F2. If the index I2 is lower than or equal to its maximum value I2x, steps S24 to S29 are executed again to process another value of the table HT2[i], otherwise, when index I2, is greater than its maximum value I1x), steps S30 and S31 are executed.

In this example, at step S30, the processing unit PC increments the index g by one (1). In step S31, the processing unit PC compares the index g with its maximum value gx, considering the number of possible distinct values for the considered part of the secret data. If the index g is lower than or equal to the maximum value gx, a new iteration from step S22 to S31 is executed to process another value of index g, otherwise (when index g is greater than its maximum value gx), steps S32 and S33 are executed. In step S18, the processing unit PC increments the index i by one (1). In step S33, the processing unit PC compares the index i with its maximum value ix corresponding to the number of traces Ci to be analyzed. If the index i is lower than or equal to the maximum value ix, steps S21 to S33 are executed again to process other tables HT1[i], HT2[i] computed for another trace Ci, otherwise (when index i is greater than its maximum value ix), step S34 is executed. In step S34, each table CH[g,VL] of cumulative two-dimensional histograms thus contained in the table CH at the location [g,VL] contains the following values:

$$CH[g, VL, 0 \ldots I1x, 0 \ldots I2x] = \sum_{M[i]} HT1_{M[i]}[0 \ldots I1x] * HT2_{M[i]}[0 \ldots I2x] \quad (1)$$

the data M[i] to be taken into account in the above sum being such that F3(OPR(M[i],g))=VL.

In this example, at step S34, the processing unit PC performs a statistical analysis of the table CH of cumulative histograms to determine whether a value of the index g corresponds to the part of the secret data being searched for. For this purpose, it is considered that the information resulting from a leakage of the secret data have been accumulated in the locations of a row g of the table CH, whereas the information independent from the secret data is distributed randomly or uniformly in the table CH. As a result, if a row of index g of the table CH contains higher values than in the rest of this table, the value of the index g at this row of the table CH corresponds to the value of the part of the secret data SD searched for. In this case, it can be considered that the secret data SD has leaked into (e.g., can be determine from) the parts EC1i, EC2i of the collected data forming the traces Ci.

FIG. 5 illustrates the content of a table HT[i] resulting from the product HT1[i]*HT2[i] of the histograms HT1[i], HT2[i] computed for one trace Ci at step S25. In this example, the values recorded in the table HT[i], for one trace Ci, have the form of a two-dimensional histogram specifying the occurrence number of each possible pair (HT1[a,i], HT2[b,i]) of one value HT1[a,i] from the table HT1[i] and one value HT2[b,i] from the table HT2[i], a being between 0 and I1x (=4 in the current example) and b being between 0 and I2x (=4 in the current example).

Figure 6:
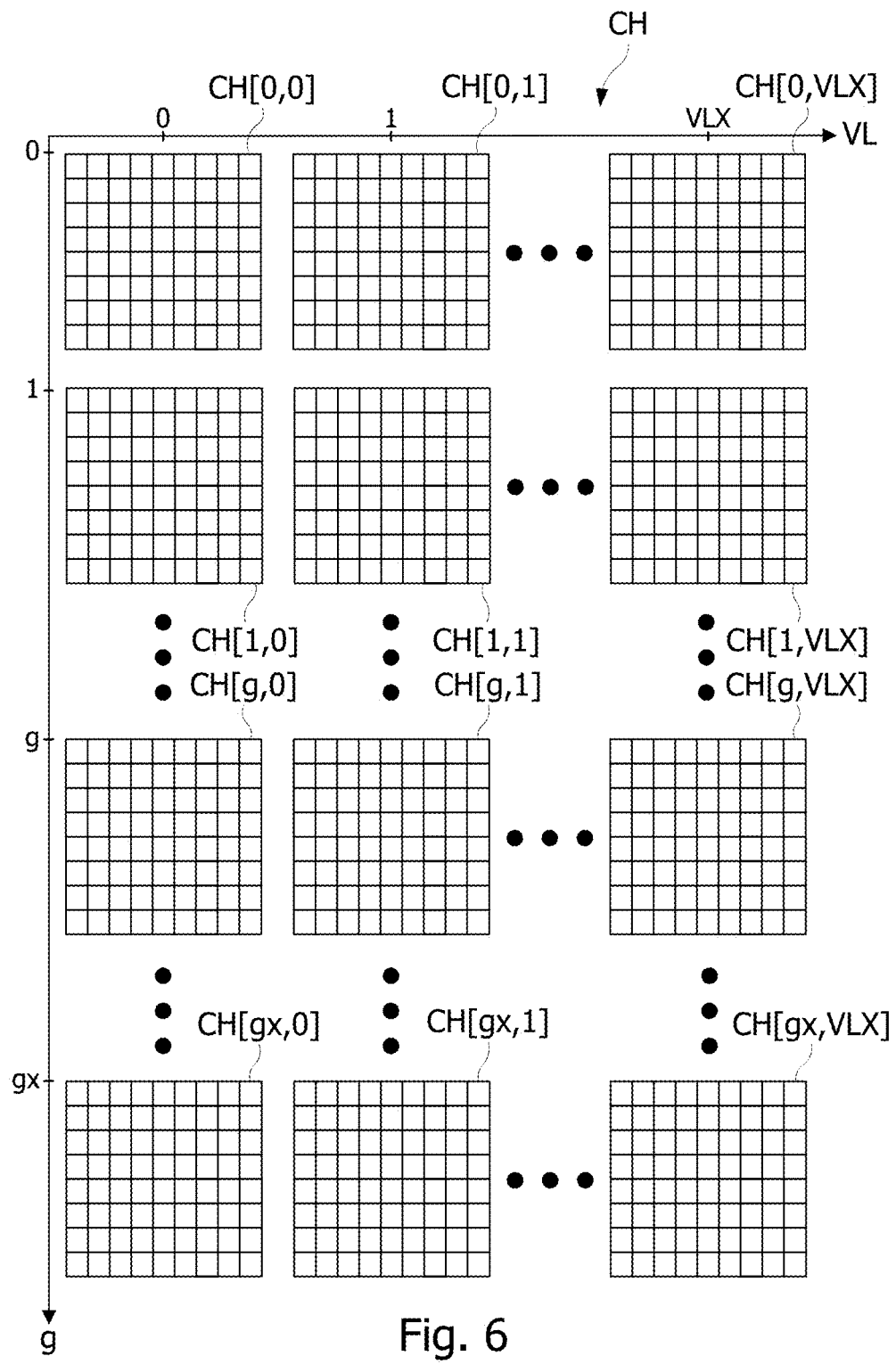

FIG. 6 illustrates an example of the structure of the table CH of cumulative histograms in which each location CH[g, VL] designated by the indices g and VL contains a two-dimensional histogram obtained by accumulating several histograms HT[i] (=HT1[i]*HT2[i]), according to the value VL obtained in step S22.

The functions F1, F2 and F3 can be chosen so as to correspond to the leakage patterns of the circuit parts or the software program parts to be tested, corresponding to the selected trace part EC1i, EC2i. Therefore, the functions F1, F2 and F3 may be the same or different from each other, and may be chosen to maximize (increase, etc.) the probability of discovering a secret data manipulated by the circuit. For example, the functions F1, F2 and F3 may be one of the following functions:

the identity function,
a function (e.g. in the form F(x)=a·x+b), with a resultant value that could be reduced to a value corresponding to a Hamming weight, for example between values 0 and 8 when x is encoded on 8 bits,
a function that computes a Hamming weight of a value provided at input of the function, for example the number of bits at 1 of the binary coded value, or
a function that computes a Hamming distance with another value, for example the difference between the numbers of bits at 1 of these two values.

It is noted that the choice of the functions F1, F2 and F3 may impact both the complexity of the statistical processing of the table CH to be performed to determine the considered part of the secret data, and the success of the statistical processing to determine the value of the part of the secret data being searched for.

The part of the secret data being searched for by executing steps S1 to S15 and from S20 to S34 may, for example, be defined on 8 or 16 bits. In the case of 8 bits, the index g is successively allocated to all the values between 0 and 255 (or 1 and 256=28). It is noted that the order in which the values of g are tested is not significant for the result of the test. The part of the secret data being searched for may also be defined on wider words such as on 16, 32 or 64 bits.

Another part of the secret data SD may be determined by executing steps S20 to S34 using the values of the previously determined parts of the secret data, and by forcing another part of the secret data to the different possible values of the index g. For this purpose, the same parts EC1i, EC2i of the traces Ci or other parts of these traces can be extracted in step S4.

It is noted that the value sets forming the traces Ci may have been collected (steps S2 and S3) before executing the other steps in FIG. 4. In addition, steps from S1 to S15 and from S20 to S34 may be performed for each of the traces Ci, before executing all these steps with another (e.g., subsequent, etc.) trace Ci.

The operation OPR/OPRK applied to the secret data SD and to the input data M[i] may be one or a combination of the following operations:

a symmetrical or asymmetrical ciphering or deciphering operation, the secret data SD being the encryption or decryption key,
a signature operation using the secret data SD,
a modular or non-modular multiplication by the secret data (M[i]×SD),
an XOR logic operation (Exclusive OR) with the secret data (M[i] XOR SD),
a modular exponentiation operation, the secret data SD being used as exponent (M[i]$^{SD}$ mod n, n being known), a modular reduction operation, the secret data SD being used as modulus (M[i] mod SD), a substitution operation by a value selected in a substitution table using the input data (SBOX[M[i]], SBOX being the substitution table), and an operation combining an XOR logic operation applied to the secret data and the substitution operation replacing the result of the logic operation with a value selected in a substitution table using the result of the XOR operation (SBOX[M[i] XOR SD]).

More generally, this operation must enable a part of the final value of the operation to be computed based solely on a part of the secret data and an input data.

Figure 7:
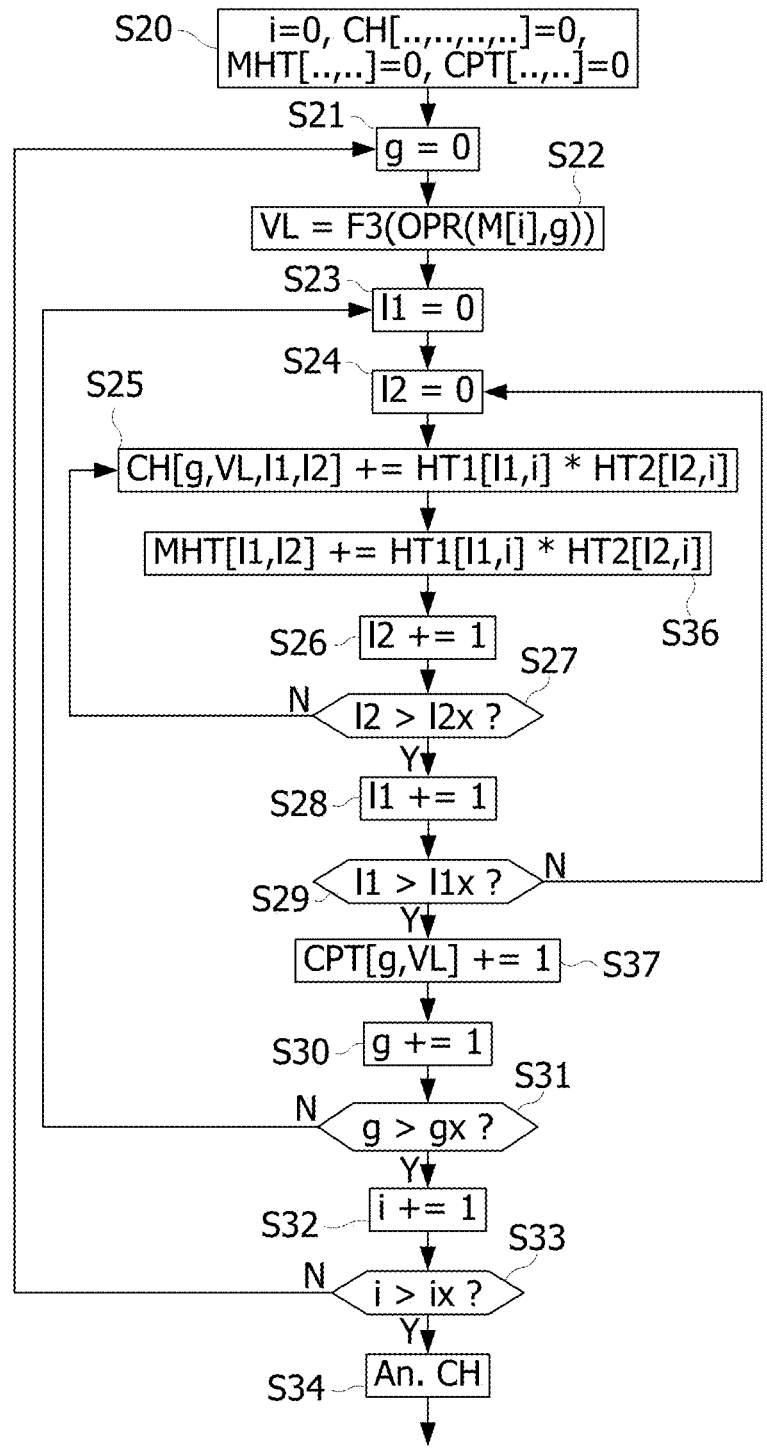
FIG. 7 illustrates a method for testing a secure circuit, according to another embodiment.

To highlight the accumulated values corresponding to the leak information about the secret data, the contents of all the tables HT[i] (HT1[i]*HT2[i]) can be added to each other to obtain a table of cumulative occurrence numbers for each possible value returned by the functions F1, F2. The values of this table of cumulative totals are subtracted from all the tables accumulated in the locations of the table CH[g,VL]. Therefore, the sequence of steps S20 to S34 in FIG. 4B may be modified in accordance with the sequence illustrated in FIG. 7. The steps (operations, functions, processes, etc.) shown in FIG. 7 include the steps S20 to S34 described above, and additional steps S36 and S37. In step S20, two-dimensional tables HT1[0 . . . ix,0 . . . I1x] and HT2[0 . . . ix,0 . . . I2x] have been previously filled in to contain all the tables generated in steps S6 and S10 for all the traces Ci. Alternately, a single three dimensional table HT[0 . . . ix,0 . . . I1x,0 . . . I2x] computed from the products (HT1[i]*HT2[i]). In step S20, two two-dimensional tables MHT, CPT are further set to 0.

Step S36 is inserted into the loop (between steps S25 and S26) controlled by the indices I1, I2, where it is possible to select one of the values provided by the functions F1, F2, for example after step S25. In step S36, the processing unit PC accumulates each value HT[i,I1,I2] (=HT1[I,I1]*HT2[I,I2]) in a table of cumulative totals MHT at a location designated by the indices I1, I2. In this way, at the end of the processing, the table MHT will contain the sum of all the values HT[i,I1,I2] of index i obtained for each of the traces Ci. Step S37 is executed once upon each iteration of the loop controlled by the index g, for example after step S29. Step S37 enables the number of tables HT[i,I1,I2] accumulated in each location CH[g,VL] of the table CH to be counted. The result of this counting is stored in a table CPT.

Figure 8:
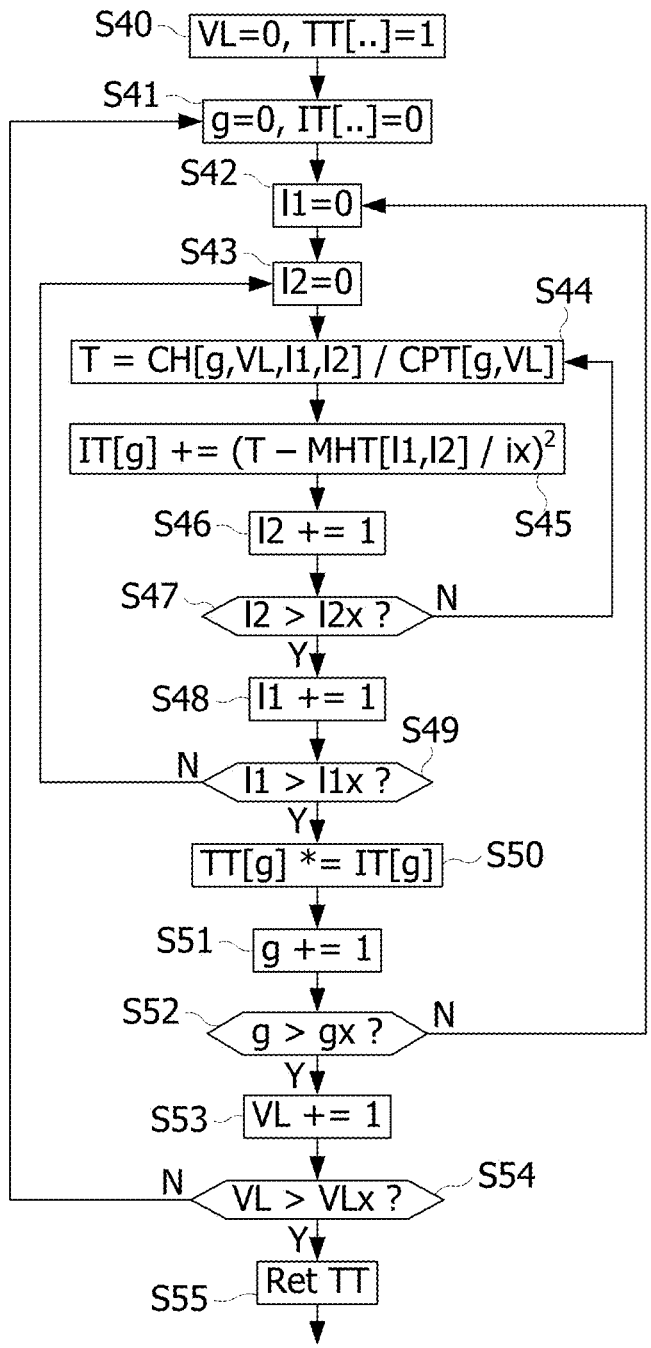
FIGS. 8 and 9 illustrate methods for statistically analyzing a value set obtained by a test method, according to various embodiments.

FIG. 8 illustrates steps (operations, functions, processes, etc.) S40 to S55 of an example of statistical processing of the table CH of cumulative histograms to attempt to determine the value of the part of the secret data SD searched for. Steps S40 to S47 are successively executed. In step S40, the index VL is set to 0 and all the locations of a table TT are set to 1. In step S41, the index g and all the locations of a table IT are set to 0. In steps S42, S43, indices I1 and I2 are respectively set to 0. In step S44, a variable T receives the value CH[g,VL,I1,I2] contained in the table CH, selected by the indices g, VL, I1 and I2, this value being divided by the counting value located at the location CPT[g,VL] in the table CPT. In step S45, the value IT[g] at the location g in the table IT is incremented by the squared result of the division by the total number ix of traces Ci, of the difference between the value of the variable T and the value MHT[I1, I2] stored in the table MHT, designated by the indices I1 and I2. In step S46, the index I2 is incremented by one (1). In step S47, the index I2 is compared with its maximum value I2x. If the index I2 has reached its maximum value I2x, steps S48 to S49 are executed, otherwise a new iteration from step S44 is executed. In step S48, the index I1 is incremented by one (1). In step S49, the index I1 is compared with its maximum value I1x. If the index I1 has reached its maximum value I1x, steps S50 to S52 are executed, otherwise a new iteration from step S43 is executed.

In step S50, the value TT[g], designated by the index g in the table TT, is updated by being multiplied by the value IT[g] computed in steps S44 and S45, executed 1× times. In step S51, the index g is incremented by one (1). In step S52, the index g is compared with its maximum value gx. If the index g is greater than its maximum value gx, steps S53 and S54 are executed, otherwise a new iteration from step S42 is executed. In step S53, the index VL is incremented by one (1). In step S54, the index VL is compared with its maximum value VLx. If the index VL is greater than its maximum value VLx, step S55 is executed, otherwise a new iteration from step S41 is executed. In step S55, the table TT is returned as result of the statistical analysis.

Therefore, upon the last iteration of the processing loop including steps S41 to S54, the tables IT and TT contain the following values:

$$IT[g, VL] = \sum_{I1=0}^{I1x} \left[ \sum_{I2=0}^{I2x} \left[ \frac{CH[g, VL, I1, I2]}{CPT[g, VL]} - \frac{MHT[I1, I2]}{ix} \right]^2 \right] \quad (2)$$

$$TT[g] = \prod_{VL=0}^{VLx} IT[g, VL] \quad (3)$$

with $CPT[g, VL] = \sum_{i=0}^{ix} (F2(OPR(M[i], g)) == VL)$, and $$MHT[I1, I2] = \sum_{g=0}^{gx} \left[ \sum_{VL=0}^{VLx} CH[g, VL, I1, I2] \right],$$

where the operator "==" represents the equality test (equal to 1 when the equality is true, and to 0 when the equality is false), the table IT being set to 0 in step S40 and loaded in step S45 for each new value of the index VL. Therefore, CPT[g,VL] represents the number of times the condition (F2(OPR(M[i],g))==VL) is true. If the secret data SD leaked when executing the operation OPRK, a location of the table TT contains a much higher value than the other values stored in this table. The result is that the part of the secret data SD searched for is equal to the index g of the highest value in the table TT.

It is noted that the values of the table IT can be added rather than being multiplied in step S50 corresponding to the equation (3). The implementation of a multiplication operation merely enables the differences between the values of the table TT to be increased, and thus the highest value corresponding to the part of the secret data being searched for to be better highlighted. It is also possible to consider applying the logarithm function to the values of the table IT and performing an additive accumulation of the logarithm values obtained, in the table TT. When the values of the table IT are added, they can be weighted as follows:

$$TT[g] = \frac{1}{ix} \sum_{VL=0}^{VLx} CPT[g, VL] \cdot IT[g, VL] \quad (4)$$

Figure 9:
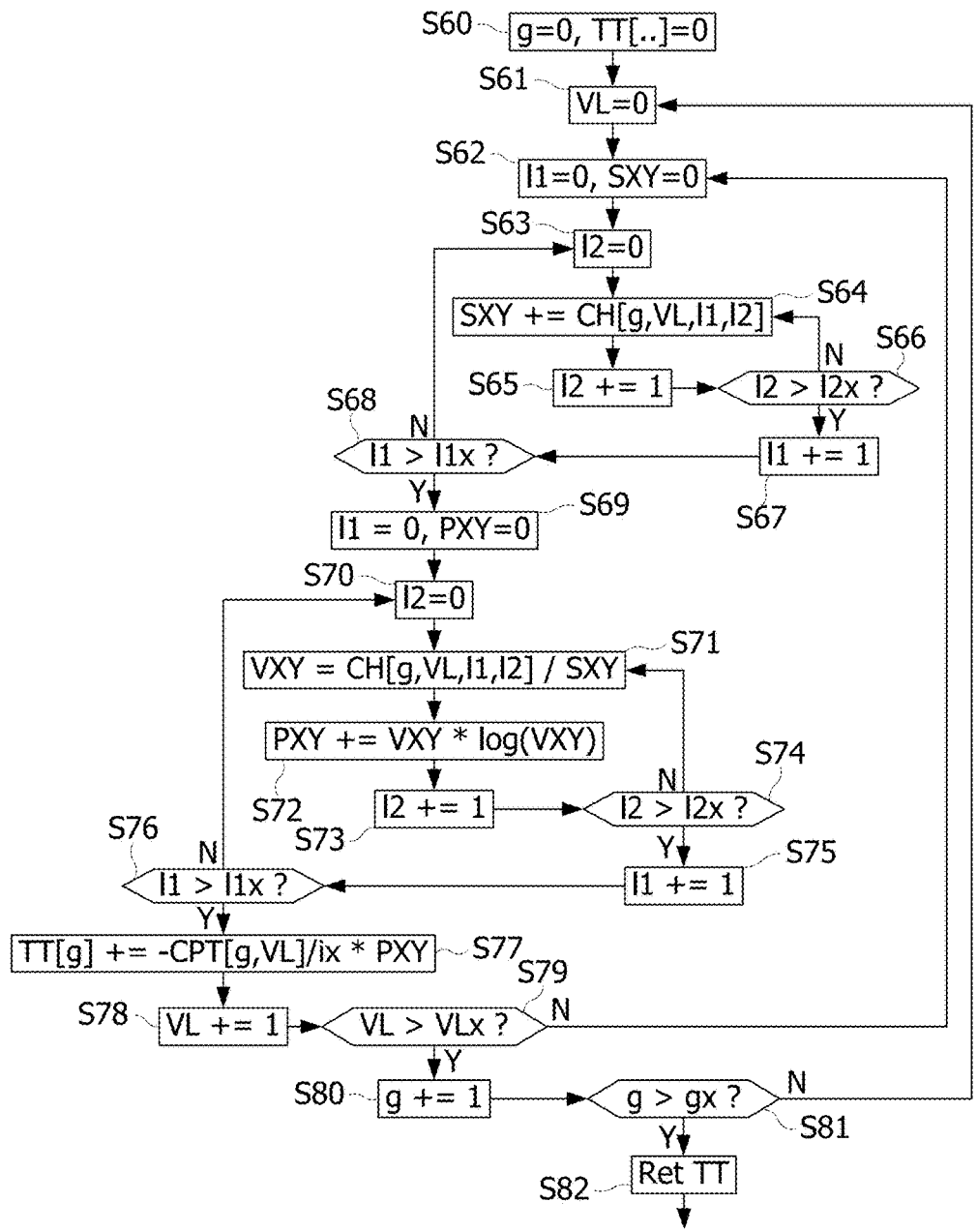

FIG. 9 illustrates steps (operations, functions, processes, etc.) S60 to S81 of another example of statistical processing of the table CH to attempt to determine the value of a part of the secret data SD being searched for. This processing is based on the Shannon entropy function. Steps S60 to S66 are successively executed. In step S60, the index g and all the locations of the table TT are set to 0. In step S61, the indices VL and I, and a variable SXY are set to 0. In steps S62 and S63, the indices I1, I2 are respectively set to 0. In step S64, the variable SXY is incremented by the value CH[g,VL,I1,I2] selected in the table CH, by the indices g, VL, I1 and I2. In step S65, the index I2 is incremented by one (1). In step S66, the index I2 is compared with its maximum value I2$x$. If the index I2 has reached its maximum value I2$x$, steps S67 and S68 are executed, otherwise a new iteration from step S64 to step S66 is executed. In step S67, the index I1 is incremented by one (1). In step S68, the index I1 is compared with its maximum value I1$x$. If the index I1 has reached its maximum value I1$x$, steps S69 to S74 are executed, otherwise a new iteration from step S63 to S68 is executed.

In step S69, the index I1 and a variable PXY are set to 0. In step S70, the index I2 is set to 0. In step S71, a variable VXY receives the value CH[g,VL,I1,I2] selected in the table CH by the indices g, VL, I1 and I2, this value being divided by the variable SYX computed by iterations from step S63 to S68. In step S72, the variable PXY is incremented by the product of the variable VXY by the logarithm (for example in base 2) of the variable VXY. In step S73, the index I2 is incremented by one (1). In step S74, the index I2 is compared with its maximum value I2$x$. If the index I2 has reached its maximum value I2$x$, steps S75 and S76 are executed, otherwise a new iteration from step S71 to step S74 is executed. In step S75, the index I1 is incremented by one (1). In step S76, the index I1 is compared with its maximum value I1$x$. If the index I1 has reached its maximum value I1$x$, steps S77 and S79 are executed, otherwise a new iteration from step S70 to step S76 is executed.

In step S77, the value TT[g] designated by the index g in the table TT is updated by subtracting from it the product of the value CPT[g,VL] divided by the number ix of traces Ci, by the variable PXY, the value CPT[g,VL] being designated by the indices g and VL in the table CPT filled in in step S37. In step S78, the index VL is incremented by one (1). In step S79, the index VL is compared with its maximum value VLx. If the index VL is greater than its maximum value VLx, steps S80 and S81 are executed, otherwise a new iteration from step S62 to S79 is executed. In step S80, the index g is incremented by one (1). In step S81, the index g is compared with its maximum value gx. If the index g is greater than its maximum value gx, step S82 is executed, otherwise a new iteration from step S61 to step S81 is executed. In step S82, the table TT is returned as result of the statistical analysis.

Therefore, upon the last iteration, after step S78, the table TT contains the following values:

$$TT[g] = -\sum_{VL=0}^{VLx}\left[\frac{CPT[g, VL]}{ix} \cdot \sum_{I1=0}^{I1x}\left[\sum_{I2=0}^{I2x}(VXY \cdot \log(VXY))\right]\right] \quad (5)$$

where $VXY = \dfrac{CH[g, VL, I1, I2]}{SXY}$, and $$SXY = \sum_{I1=0}^{I1x}\left[\sum_{I2=0}^{I2x}(CH[g, VL, I1, I2])\right]$$

is computed for each of the values of the indices g and VL, and each value of the index g represents a possible value of the part of the key searched for. If the secret data SD leaked when processing the operation OPRK, a location of the table TT contains a much higher value than the other values stored in this table. The result is that the part of the secret data SD searched for is equal to the index g of the highest value in the table TT.

Figure 10:
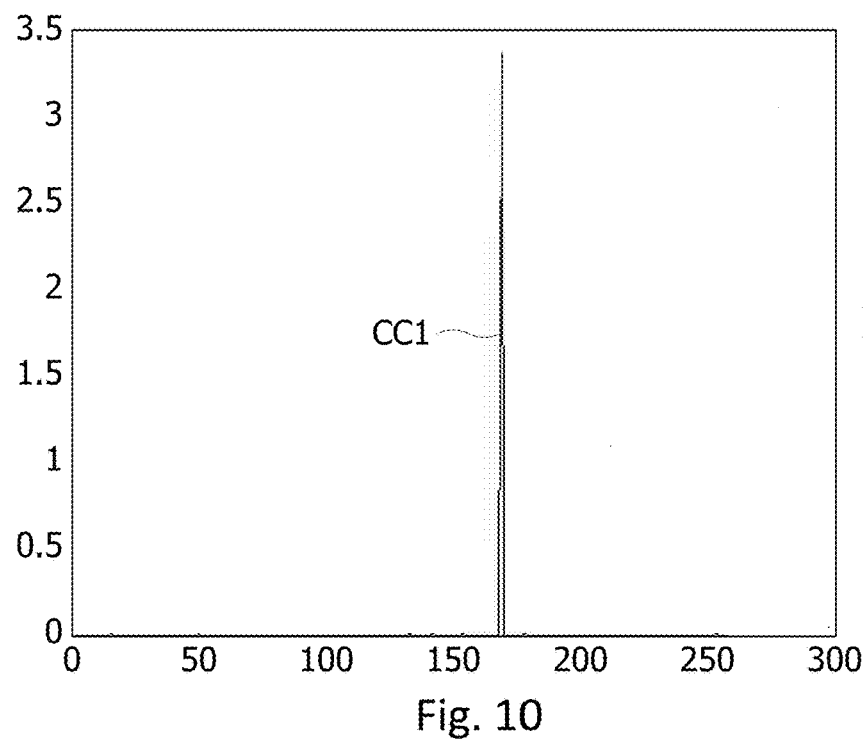
FIGS. 10 and 11 illustrate, in the form of curves, result tables provided by the analysis methods of FIGS. 8 and 9.
Figure 11:
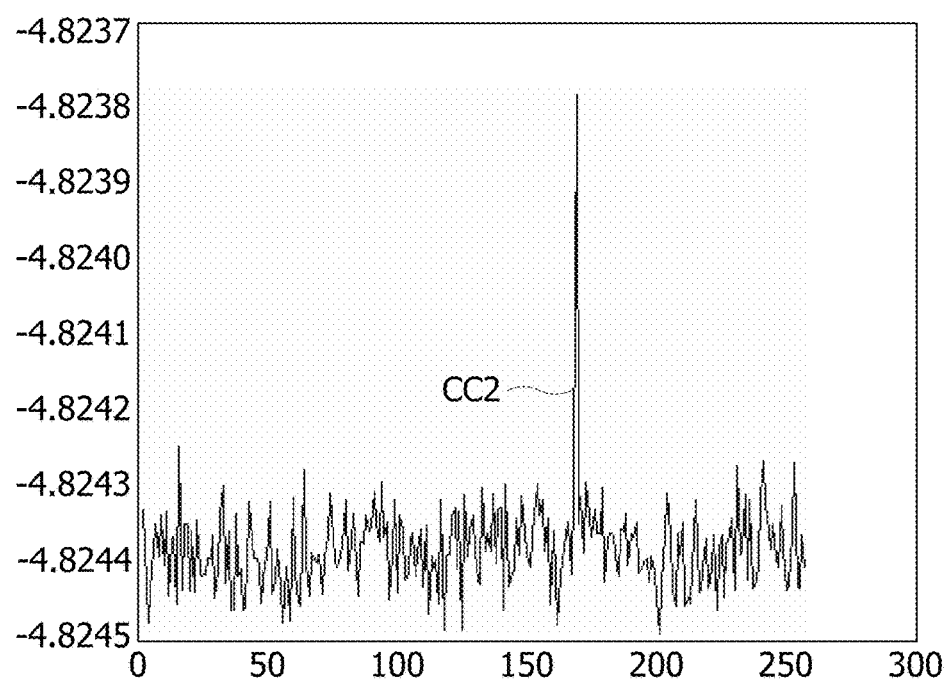

FIGS. 10 and 11 illustrate, in the form of curves CC1, CC2, an example of content of the table TT as a function of the index g. The curve CC1 was obtained by executing the steps in FIG. 8, and the curve CC2 was obtained by executing the steps in FIG. 9. In the example of FIGS. 10 and 11, the index g has a length of one byte (thus varying from 0 to 255), and curves CC1 and CC2 have been obtained from a number of traces Ci of the order of 500,000. Curves CC1 and CC2 have a clear peak at the value g=168 compared to the other values contained in the table TT. The value of the peak in the curve CC1 is greater than about thirty times the other values of the table TT. In the curve CC2, the value of the peak is greater than three times the other values of the table TT. Depending on the statistical processing of the table CH, it may be considered that the part of the secret data being searched for leaks when a peak is obtained that remains at a value greater than 0.9 times the closest value, by increasing the number of analyzed traces Ci.

So that circuits, such as integrated circuits, as described herein can successfully pass known qualification or certification procedures, the designers of these circuits provide counter-measures the most conventional of which involve introducing a time variable. The calculation of the values in the tables HT1, HT2 enables the time aspect to be removed from the analyzed values, and avoids having to synchronize, or align in time the different traces of the analyzed values. Provided that information concerning the secret data being searched for is in the analyzed data, the test method previously described may enable all or part of the secret data to be determined. Therefore, the previously described test method can detect whether or not secret data manipulated by a circuit leak in signals that can be acquired from outside of the circuit.

Since the previously described test method combines two parts EC1$i$, EC2$i$ of each trace Ci, it is of the order 2. The previously described test method can be adapted to order n, n being greater than 2, by selecting n parts EC1$i$ to ECn$i$ in each of the traces Ci, and by adapting the test method to consider each possible different n-tuple associating together one value of each part ECki of each trace Ci (k ranging from 1 to n). A test method of order n would generate cumulative n-dimensional histograms CH[g,VL] in the table CH.

In a general aspect, a test method for a circuit can include: acquiring a plurality of value sets, each value set comprising values of a physical quantity or of logic signals, linked to the activity of a circuit to be tested when the circuit executes an operation of an operation set of distinct cryptographic operations applied to a same data to be discovered, selecting at least two subsets of values in each value set, for each value set and each value subset, counting by a processing unit occurrence numbers of values transformed by a respective first surjective function applied to the values of the subset of the value set, for each value set, forming n-tuples associating together one of the occurrence numbers of each of the value subsets of the value set, computing a combined occurrence number for each n-tuple of the value set by multiplying together the occurrence numbers associated by the n-tuple, and forming an occurrence number set for the value set comprising combined occurrence numbers computed for the value set, for each operation of the operation set, and each of the possible values of a part of the data to be discovered, computing by the processing unit a partial operation result, computing by the processing unit cumulative occurrence number sets, each cumulative occurrence number set being obtained by adding together the occurrence number sets corresponding to the operations of the operation set, which when applied to a same value or equivalent value of the possible values of the part of the data to be discovered, provide a partial operation result having a same transformed value resulting from the application of a second surjective function, and analyzing by the processing unit the cumulative occurrence number sets to determine the part of the data to be discovered, knowing that if the data to be discovered has leaked into the value sets, it is found in the cumulative occurrence number sets corresponding to the value of the part of the data to be discovered.

Implementations can include one or more of the following features. For example, the method can include: transmitting to the circuit a plurality of distinct commands, each command triggering the execution by the circuit of one of the operations of the operation set, applied to the data to be discovered, and during the execution by the circuit of each operation, collecting by a measuring device, the values of one of the value sets.

The subsets of each value set can include measurements of respective distinct signals. The value sets can include: measurements of current consumption of the circuit, and/or measurements of electromagnetic radiation emitted by the circuit, and/or measurements of absorption of magnetic field present around the circuit, and/or logic signals or digital values collected in the circuit.

Each of the first and second surjective functions can be one of the following functions: an identity function, a function providing a resultant value which is then reduced to a value corresponding to a Hamming weight, a function providing the Hamming weight of the value to which the function is applied, and a function providing a Hamming distance between a value and a preceding value to which the function is applied.

The method can include rejecting the circuit or the program executed by the circuit if the analyzing step determines the part of the data to be discovered.

Computing an operation result for each of the possible values of a part of the data to be discovered, computing the sums of occurrence numbers, and analyzing the sums of occurrence numbers can be performed for a previously determined part of the data to be discovered and another part of the data to be discovered.

The selected subsets in each value set can include: consecutive values of the value set, and/or non-consecutive values of the value set, and/or local extreme (e.g., maximum and/or minimum) values of the value set, and/or all the values of the value set.

The operations of the operation set can include applying a single operation to the data to be discovered and to an input data of a set of input data. The single operation can include at least one of the following operations: a symmetrical or asymmetrical encryption or decryption operation, a signature operation, a modular or non-modular multiplication by the data to be discovered, a logic Exclusive OR operation with the data to be discovered, a modular exponentiation operation, the data to be discovered being used as exponent, a modular reduction operation, the data to be discovered being used as modulus, a substitution operation by a value selected in a substitution table using the input value, and an operation combining a logic Exclusive OR operation with the data to be discovered and a substitution operation replacing the result of the logic operation with a value selected in a substitution table using the result of the logic operation.

The analysis of the cumulative occurrence numbers can include: for each cumulative occurrence numbers, computing a normalized sum by dividing the cumulative occurrence numbers by a corresponding number of occurrence numbers accumulated in the cumulative occurrence number, for each possible value of the part of the data to be discovered and each possible value of the transformed partial result, computing a sum of squared differences, between each normalized cumulative occurrence number corresponding to the possible value of the part of the data to be discovered and the possible value of the transformed partial result, and an average value of the cumulative occurrence numbers, divided by a number of operations, for each possible value of the part of the data to be discovered, computing a cumulative total of difference sums corresponding to the possible values of the transformed partial results, and comparing with each other the cumulative totals of difference sums, and detecting whether a cumulative total of difference sums for a possible value of the part of the data to be discovered is greater than the other cumulative totals of difference sums.

The analysis of the sums of occurrence numbers can include: for each possible value of the part of the data to be discovered and each possible value of the transformed partial result, computing a cumulative total of the sums of occurrence numbers, for each cumulative occurrence numbers, computing a normalized cumulative total by dividing the cumulative occurrence numbers by the corresponding cumulative total, and computing the product of the normalized cumulative total by the logarithm of the normalized cumulative total, for each possible value of the part of the data to be discovered and each possible value of the transformed partial result, computing a sum of the products corresponding to the possible value of the part of the data to be discovered and the possible value of the transformed partial result, for each possible value of the part of the data to be discovered, computing a cumulative total of the product sums corresponding to the possible values of the transformed partial results, each product sum being multiplied by a corresponding number of sums of occurrence numbers, and comparing with each other the cumulative totals of product sums, and detecting whether one of the cumulative totals of product sums for a possible value of the part of the data to be discovered is greater than the other cumulative totals of product sums.

In another general aspect, a system for testing a circuit can include a measuring device and a processing unit configured to: acquire a plurality of value sets, each value set comprising values of a physical quantity or of logic signals, linked to the activity of a circuit to be tested when the circuit executes an operation of an operation set of distinct cryptographic operations applied to a same data to be discovered, select at least two subsets of values in each value set, for each value set and each value subset, count occurrence numbers of values transformed by a respective first surjective function applied to the values of the subset of the value set, for each value set, form n-tuples associating together one of the occurrence numbers of each of the value subsets of the value set, compute a combined occurrence number for each n-tuple of the value set by multiplying together the occurrence numbers associated by the n-tuple, and form an occurrence number set for the value set comprising combined occurrence numbers computed for the value set, for each operation of the operation set, and each of the possible values of a part of the data to be discovered, compute a partial operation result, compute cumulative occurrence number sets, each cumulative occurrence number set being obtained by adding together the occurrence number sets corresponding to the operations of the operation set, which when applied to a same value or equivalent value of the possible values of the part of the data to be discovered, provide a partial operation result having a same transformed value resulting from the application of a second surjective function, and analyze the cumulative occurrence number sets to determine the part of the data to be discovered, knowing that if the data to be discovered has leaked into the value sets, it is found in the cumulative occurrence number sets corresponding to the value of the part of the data to be discovered.

Implementations can include one or more of the following features. For example, the system can include a measuring probe coupled to the measuring device for acquiring traces linked to the activity of the circuit. The system can include an emulator executing an application to be tested.

The processing unit can be further configured to: transmit to the circuit a plurality of distinct commands, each command triggering the execution by the circuit of one of the operations of the operation set, applied to the data to be discovered, and during the execution by the circuit of each operation, collect by a measuring device, the values of one of the value sets.

The subsets of each value set can include measurements of respective distinct signals. The value sets can include: measurements of current consumption of the circuit, and/or measurements of electromagnetic radiation emitted by the circuit, and/or measurements of absorption of magnetic field present around the circuit, and/or logic signals or digital values collected in the circuit.

Each of the first and second surjective functions can be one of the following functions: an identity function, a function providing a resultant value which is then reduced to a value corresponding to a Hamming weight, a function providing the Hamming weight of the value to which the function is applied, and a function providing a Hamming distance between a value and a preceding value to which the function is applied.

The processing unit can be further configured to reject the circuit or the program executed by the circuit if the analyzing step determines the part of the data to be discovered. The processing unit can be further configured to perform the operations of computing an operation result for each of the possible values of a part of the data to be discovered, of computing the sums of occurrence numbers, and of analyzing the sums of occurrence numbers, for a previously determined part of the data to be discovered and another part of the data to be discovered to be discovered.

The selected subsets in each value set can include: consecutive values of the value set, and/or non-consecutive values of the value set, and/or local extremum values of the value set, and/or all the values of the value set.

The operations of the operation set can include applying a single operation to the data to be discovered and to an input data of a set of input data. The single operation comprising at least one of the following operations: a symmetrical or asymmetrical encryption or decryption operation, a signature operation, a modular or non-modular multiplication by the data to be discovered, a logic Exclusive OR operation with the data to be discovered, a modular exponentiation operation, the data to be discovered being used as exponent, a modular reduction operation, the data to be discovered being used as modulus, a substitution operation by a value selected in a substitution table using the input value, and an operation combining a logic Exclusive OR operation with the data to be discovered and a substitution operation replacing the result of the logic operation with a value selected in a substitution table using the result of the logic operation.

The analysis of the cumulative occurrence numbers can include: for each cumulative occurrence numbers, computing a normalized sum by dividing the cumulative occurrence numbers by a corresponding number of occurrence numbers accumulated in the cumulative occurrence number, for each possible value of the part of the data to be discovered and each possible value of the transformed partial result, computing a sum of squared differences, between each normalized cumulative occurrence number corresponding to the possible value of the part of the data to be discovered and the possible value of the transformed partial result, and an average value of the cumulative occurrence numbers, divided by a number of operations, for each possible value of the part of the data to be discovered, computing a cumulative total of difference sums corresponding to the possible values of the transformed partial results, and comparing with each other the cumulative totals of difference sums, and detecting whether a cumulative total of difference sums for a possible value of the part of the data to be discovered is greater than the other cumulative totals of difference sums.

The analysis of the sums of occurrence numbers can include: for each possible value of the part of the data to be discovered and each possible value of the transformed partial result, computing a cumulative total of the sums of occurrence numbers, for each cumulative occurrence numbers, computing a normalized cumulative total by dividing the cumulative occurrence numbers by the corresponding cumulative total, and computing the product of the normalized cumulative total by the logarithm of the normalized cumulative total, for each possible value of the part of the data to be discovered and each possible value of the transformed partial result, computing a sum of the products corresponding to the possible value of the part of the data to be discovered and the possible value of the transformed partial result, for each possible value of the part of the data to be discovered, computing a cumulative total of the product sums corresponding to the possible values of the transformed partial results, each product sum being multiplied by a corresponding number of sums of occurrence numbers, and comparing with each other the cumulative totals of product sums, and detecting whether one of the cumulative totals of product sums for a possible value of the part of the data to be discovered is greater than the other cumulative totals of product sums.

In another general aspect, a non-transitory computer-readable medium can carry (include, have stored thereon, etc.) one or more sequences of instructions, which, when executed by one or more processors, can cause the one or more processors to: acquire a plurality of value sets, each value set comprising values of a physical quantity or of logic signals, linked to the activity of a circuit to be tested when the circuit executes an operation of an operation set of distinct cryptographic operations applied to a same data to be discovered, select at least two subsets of values in each value set, for each value set and each value subset, count occurrence numbers of values transformed by a respective first surjective function applied to the values of the subset of the value set, for each value set, form n-tuples associating together one of the occurrence numbers of each of the value subsets of the value set, compute a combined occurrence number for each n-tuple of the value set by multiplying together the occurrence numbers associated by the n-tuple, and form an occurrence number set for the value set comprising combined occurrence numbers computed for the value set, for each operation of the operation set, and each of the possible values of a part of the data to be discovered, compute a partial operation result, compute cumulative occurrence number sets, each cumulative occurrence number set being obtained by adding together the occurrence number sets corresponding to the operations of the operation set, which when applied to a same value or equivalent value of the possible values of the part of the data to be discovered, provide a partial operation result having a same transformed value resulting from the application of a second surjective function, and analyze the cumulative occurrence number sets to determine the part of the data to be discovered, knowing that if the data to be discovered has leaked into the value sets, it is found in the cumulative occurrence number sets corresponding to the value of the part of the data to be discovered.

Implementations can include one or more of the following features. For example, the one or more sequences of instructions, when executed by the one or more processors, can cause the one or more processors to: transmit to the circuit a plurality of distinct commands, each command triggering the execution by the circuit of one of the operations of the operation set, applied to the data to be discovered, and during the execution by the circuit of each operation, collect by a measuring device, the values of one of the value sets.

The subsets of each value set can include measurements of respective distinct signals. The value sets can include: measurements of current consumption of the circuit, and/or measurements of electromagnetic radiation emitted by the circuit, and/or measurements of absorption of magnetic field present around the circuit, and/or logic signals or digital values collected in the circuit.

Each of the first and second surjective functions can be one of the following functions: an identity function, a function providing a resultant value which is then reduced to a value corresponding to a Hamming weight, a function providing the Hamming weight of the value to which the function is applied, and a function providing a Hamming distance between a value and a preceding value to which the function is applied.

The one or more sequences of instructions, when executed by the one or more processors, can cause the one or more processors to reject the circuit or the program executed by the circuit if the analyzing step determines the part of the data to be discovered.

The one or more sequences of instructions, when executed by the one or more processors, can cause the one or more processors to perform the operations of computing an operation result for each of the possible values of a part of the data to be discovered, of computing the sums of occurrence numbers, and of analyzing the sums of occurrence numbers, for a previously determined part of the data to be discovered and another part of the data to be discovered.

The selected subsets in each value set can include: consecutive values of the value set, and/or non-consecutive values of the value set, and/or local extremum values of the value set, and/or all the values of the value set.

The operations of the operation set can include applying a single operation to the data to be discovered and to an input data of a set of input data. The single operation can include at least one of the following operations: a symmetrical or asymmetrical encryption or decryption operation, a signature operation, a modular or non-modular multiplication by the data to be discovered, a logic Exclusive OR operation with the data to be discovered, a modular exponentiation operation, the data to be discovered being used as exponent, a modular reduction operation, the data to be discovered being used as modulus, a substitution operation by a value selected in a substitution table using the input value, and an operation combining a logic Exclusive OR operation with the data to be discovered and a substitution operation replacing the result of the logic operation with a value selected in a substitution table using the result of the logic operation.

The analysis of the cumulative occurrence numbers can include: for each cumulative occurrence numbers, computing a normalized sum by dividing the cumulative occurrence numbers by a corresponding number of occurrence numbers accumulated in the cumulative occurrence number, for each possible value of the part of the data to be discovered and each possible value of the transformed partial result, computing a sum of squared differences, between each normalized cumulative occurrence number corresponding to the possible value of the part of the data to be discovered and the possible value of the transformed partial result, and an average value of the cumulative occurrence numbers, divided by a number of operations, for each possible value of the part of the data to be discovered, computing a cumulative total of difference sums corresponding to the possible values of the transformed partial results, and comparing with each other the cumulative totals of difference sums, and detecting whether a cumulative total of difference sums for a possible value of the part of the data to be discovered is greater than the other cumulative totals of difference sums.

The analysis of the sums of occurrence numbers can include: for each possible value of the part of the data to be discovered and each possible value of the transformed partial result, computing a cumulative total of the sums of occurrence numbers, for each cumulative occurrence numbers, computing a normalized cumulative total by dividing the cumulative occurrence numbers by the corresponding cumulative total, and computing the product of the normalized cumulative total by the logarithm of the normalized cumulative total, for each possible value of the part of the data to be discovered and each possible value of the transformed partial result, computing a sum of the products corresponding to the possible value of the part of the data to be discovered and the possible value of the transformed partial result, for each possible value of the part of the data to be discovered, computing a cumulative total of the product sums corresponding to the possible values of the transformed partial results, each product sum being multiplied by a corresponding number of sums of occurrence numbers, and comparing with each other the cumulative totals of product sums, and detecting whether one of the cumulative totals of product sums for a possible value of the part of the data to be discovered is greater than the other cumulative totals of product sums.

The invention claimed is:

1. A method for testing a circuit, comprising:
    acquiring, by a processing unit, a plurality of value sets, each value set including values of a physical quantity or values of logic signals linked to an activity of the circuit to be tested when the circuit executes an operation of an operation set of distinct cryptographic operations applied to a same data to be discovered;

selecting, by the processing unit, at least two subsets of values in each value set;

for each subset of values of each value set, counting, by the processing unit, occurrence numbers of values transformed by a respective first surjective function applied to the values of the at least two subsets of the value set;

for each value set, forming n-tuples associating together one of the occurrence numbers of each subset of values of the value set, computing, by the processing unit, a combined occurrence number for each n-tuple of the value set by multiplying together the occurrence numbers associated by the n-tuple, and forming an occurrence number set for the value set including the combined occurrence numbers computed for the value set;

for each operation of the operation set, and each possible value of a part of the data to be discovered, computing, by the processing unit, a partial operation result;

computing, by the processing unit, cumulative occurrence number sets of cumulative occurrence numbers, each cumulative occurrence number set being obtained by adding together the occurrence number sets corresponding to operations of the operation set, which when applied to a same value or equivalent value of the possible values of the part of the data to be discovered, provide one of the partial operation results having a same transformed value resulting from an application of a second surjective function; and analyzing, by the processing unit, the cumulative occurrence number sets to determine the part of the data to be discovered, in which if the data to be discovered has leaked into the plurality of value sets, the part of the data to be discovered is in the cumulative occurrence number sets corresponding to the value of the part of the data to be discovered.

2. The method according to claim 1, further comprising:

transmitting to the circuit a plurality of distinct commands, each command triggering an execution by the circuit of one of the operations of the operation set applied to the data to be discovered, and during the execution by the circuit of each operation, collecting, by a measuring device, the values of one of the plurality value sets.

3. The method according to claim 1, wherein the at least two subsets of values in each value set include measurements of respective distinct signals.

4. The method according to claim 1, wherein the plurality of value sets include at least one of:

measurements of current consumption of the circuit;

measurements of electromagnetic radiation emitted by the circuit;

measurements of absorption of magnetic field present around the circuit; or logic signal values or digital values collected in the circuit.

5. The method according to claim 1, wherein each of the first surjective function and the second surjective function is at least one of the following functions:

an identity function;

a function providing a resultant value which is reduced to a value corresponding to a Hamming weight;

a function providing the Hamming weight of the value to which the function is applied; or a function providing a Hamming distance between a value and a preceding value to which the function is applied.

6. The method according to claim 1, further comprising rejecting the circuit or a program executed by the circuit if the analyzing of the cumulative occurrence number sets determines the part of the data to be discovered.

7. The method according to claim 1, wherein the computing of the partial operation result for each possible value of the part of the data to be discovered, the computing of the cumulative occurrence number sets, and the analyzing of the cumulative occurrence number sets are performed for a previously determined part of the data to be discovered and another part of the data to be discovered.

8. The method according to claim 1, wherein each of the selected subsets in each value set include at least one of:

consecutive values of the value set;

non-consecutive values of the value set;

local extremum values of the value set; or all values of the value set.

9. The method according to claim 1, wherein each operation of the operation set includes applying a single operation to the data to be discovered and to an input data of a set of input data, the single operation including at least one of:

a symmetrical or asymmetrical encryption or decryption operation;

a signature operation;

a modular or non-modular multiplication operation by the data to be discovered;

an Exclusive OR operation with the data to be discovered;

a modular exponentiation operation, the data to be discovered being used as exponent;

a modular reduction operation, the data to be discovered being used as modulus;

a substitution operation by a value selected in a substitution table using the input data; or an operation combining an Exclusive OR operation with the data to be discovered and a substitution operation replacing a result of the Exclusive OR operation with a value selected in a substitution table using the result of the Exclusive OR operation.

10. The method according to claim 1, wherein the analysis of the cumulative occurrence number sets includes:

for each cumulative occurrence number, computing, by the processing unit, a normalized sum by dividing the cumulative occurrence number by a corresponding number of occurrence numbers accumulated in the cumulative occurrence number;

for each possible value of the part of the data to be discovered and each possible transformed value of the partial operation results, computing, by the processing unit, a sum of squared differences between each normalized cumulative occurrence number corresponding to the possible value of the part of the data to be discovered and the possible transformed value of the partial operation results, and an average value of the cumulative occurrence numbers, divided by a number of operations in the operation set;

for each possible value of the part of the data to be discovered, computing, by the processing unit, a cumulative total of difference sums corresponding to the possible transformed values of the partial operation results; and comparing with each other, by the processing unit, the cumulative totals of difference sums, and detecting whether one of the cumulative totals of difference sums for one of the possible values of the part of the data to be discovered is greater than other cumulative totals of difference sums.

11. The method according to claim 1, wherein the analysis of the cumulative occurrence number sets includes:

for each possible value of the part of the data to be discovered and each possible transformed value of the partial operation results, computing, by the processing unit, a cumulative total of cumulative occurrence numbers of a corresponding cumulative occurrence number set;

for each cumulative occurrence number, computing, by the processing unit, a normalized cumulative number by dividing the cumulative occurrence number by the cumulative total of the corresponding cumulative occurrence number set, and computing a product of the normalized cumulative number by a logarithm of the normalized cumulative number;

for each possible value of the part of the data to be discovered and each possible transformed value of the partial operation results, computing, by the processing unit, a sum of the products corresponding to the possible value of the part of the data to be discovered and the possible transformed value of the partial operation results;

for each possible value of the part of the data to be discovered, computing, by the processing unit, a cumulative total of the sums of products corresponding to the possible transformed values of the partial operation results, each sum of products being multiplied by a corresponding number of the cumulative occurrence numbers; and comparing with each other, by the processing unit, the cumulative totals of the sums of products, and detecting whether one of the cumulative totals of the sums of products for one of the possible values of the part of the data to be discovered is greater than other cumulative totals of the sums of products.

12. A system for testing a circuit, the system comprising:
a processor configured to:
  acquire and store in a memory a plurality of value sets, each value set including values of a physical quantity or values of logic signals linked to an activity of the circuit to be tested when the circuit executes an operation of an operation set of distinct cryptographic operations applied to a same data to be discovered, the values of the physical quantity or the values of logic signals being acquired by a measuring device coupled to the circuit;
  select at least two subsets of values in each value set;
  for each subset of values of each value set, count occurrence numbers of values transformed by a respective first surjective function applied to the values of the at least two subsets of the value set;
  for each value set, form n-tuples associating together one of the occurrence numbers of each subset of values of the value set, compute a combined occurrence number for each n-tuple of the value set by multiplying together the occurrence numbers associated by the n-tuple, and form an occurrence number set for the value set including the combined occurrence numbers computed for the value set;
  for each operation of the operation set, and each possible value of a part of the data to be discovered, compute a partial operation result;
  compute cumulative occurrence number sets of cumulative occurrence numbers, each cumulative occurrence number set being obtained by adding together the occurrence number sets corresponding to the operations of the operation set, which when applied to a same value or equivalent value of the possible values of the part of the data to be discovered, provide one of the partial operation results having a same transformed value resulting from an application of a second surjective function; and
  analyze the cumulative occurrence number sets to determine the part of the data to be discovered, in which, if the data to be discovered has leaked into the plurality of value sets, the part of the data to be discovered is in the cumulative occurrence number sets corresponding to the value of the part of the data to be discovered.

13. The system according to claim 12, further comprising the measuring device and a measuring probe coupled to the measuring device and to the circuit for acquiring traces linked to the activity of the circuit.

14. The system according to claim 12, wherein the circuit is an emulator executing an application to be tested.

15. The system according to claim 12, wherein the processor is further configured to:
  transmit, to the circuit, a plurality of distinct commands, each command triggering the execution by the circuit of one of the operations of the operation set, applied to the data to be discovered; and
  during the execution by the circuit of each operation of the operation set, collect, by the measuring device, the values of one of the plurality of value sets.

16. The system according to claim 12, wherein the at least two subsets of values in each value set include measurements of respective distinct signals.

17. The system according to claim 12, wherein the plurality of value sets includes at least one of:
  measurements of current consumption of the circuit;
  measurements of electromagnetic radiation emitted by the circuit;
  measurements of absorption of magnetic field present around the circuit; or
  logic signal values or digital values collected in the circuit.

18. The system according to claim 12, wherein each of the first surjective function and the second surjective function is at least one of the following functions:
  an identity function;
  a function providing a resultant value which is reduced to a value corresponding to a Hamming weight;
  a function providing the Hamming weight of the value to which the function is applied; or
  a function providing a Hamming distance between a value and a preceding value to which the function is applied.

19. The system according to claim 12, wherein the processor is further configured to reject the circuit or a program executed by the circuit if the analyzing of the cumulative occurrence number sets determines the part of the data to be discovered.

20. The system according to claim 12, wherein the computation of the partial operation result for each possible value of the part of the data to be discovered, the computation of the sums of cumulative occurrence number sets, and the analysis of the cumulative occurrence number sets, are performed for a previously determined part of the data to be discovered and another part of the data to be discovered to be discovered.

21. The system according to claim 12, wherein each of the selected subsets in each value set include at least one of:
  consecutive values of the value set;
  non-consecutive values of the value set;
  local extremum values of the value set; or
  all values of the value set.

22. The system according to claim 12, wherein each operation of the operation set includes applying a single operation to the data to be discovered and to an input data of a set of input data, the single operation includes at least one of the following operations:
- a symmetrical or asymmetrical encryption or decryption operation;
- a signature operation;
- a modular or non-modular multiplication operation by the data to be discovered;
- an Exclusive OR operation with the data to be discovered;
- a modular exponentiation operation, the data to be discovered being used as exponent;
- a modular reduction operation, the data to be discovered being used as modulus;
- a substitution operation by a value selected in a substitution table using an input value; or
- an operation combining an Exclusive OR operation with the data to be discovered and a substitution operation replacing a result of the Exclusive OR operation with a value selected in a substitution table using the result of the Exclusive OR operation.

23. The system according to claim 12, wherein the analysis of the cumulative occurrence number sets comprises:
- for each cumulative occurrence number, computing a normalized sum by dividing the cumulative occurrence number by a corresponding number of occurrence numbers accumulated in the cumulative occurrence number;
- for each possible value of the part of the data to be discovered and each possible transformed value of partial operation results, computing a sum of squared differences between each normalized cumulative occurrence number corresponding to the possible value of the part of the data to be discovered and the possible transformed value of the partial operation results, and an average value of the cumulative occurrence numbers, divided by a number of operations in the operation set;
- for each possible value of the part of the data to be discovered, computing a cumulative total of difference sums corresponding to the possible transformed values of the partial operation results; and
- comparing with each other the cumulative totals of difference sums, and detecting whether one of the cumulative totals of difference sums for one of the possible values of the part of the data to be discovered is greater than other cumulative totals of difference sums.

24. The system according to claim 12, wherein the analysis of the occurrence number sets comprises:
- for each possible value of the part of the data to be discovered and each possible transformed value of the partial operation results, computing a cumulative total of cumulative occurrence numbers of a corresponding cumulative occurrence number set,
- for each cumulative occurrence number, computing a normalized cumulative number by dividing the cumulative occurrence number by the cumulative total of the corresponding cumulative occurrence number set, and computing a product of the normalized cumulative number by a logarithm of the normalized cumulative number;
- for each possible value of the part of the data to be discovered and each possible transformed value of the partial operation results, computing a sum of the products corresponding to the possible value of the part of the data to be discovered and the possible transformed value of the partial operation results;
- for each possible value of the part of the data to be discovered, computing a cumulative total of the sum of the products corresponding to the possible transformed values of the partial operation results, each sum of products being multiplied by a corresponding number of the cumulative occurrence numbers; and
- comparing with each other the cumulative totals of the sums of products, and detecting whether one of the cumulative totals of the sums of products for one of the possible values of the part of the data to be discovered is greater than other cumulative totals of the sums of products.

25. A non-transitory computer-readable medium carrying one or more sequences of instructions, which when executed by one or more processors, cause the one or more processors to:
- acquire a plurality of value sets, each value set including values of a physical quantity or values of logic signals linked to an activity of a circuit to be tested when the circuit executes an operation of an operation set of distinct cryptographic operations applied to a same data to be discovered;
- select at least two subsets of values in each value set;
- for each subset of values of each value set, count occurrence numbers of values transformed by a respective first surjective function applied to the values of the at least two subsets of each value set;
- for each value set, form n-tuples associating together one of the occurrence numbers of each subset of values of the value set, compute a combined occurrence number for each n-tuple of the value set by multiplying together the occurrence numbers associated by the n-tuple, and form an occurrence number set for each value set including the combined occurrence numbers computed for the value set;
- for each operation of the operation set, and each possible value of a part of the data to be discovered, compute a partial operation result;
- compute cumulative occurrence number sets of cumulative occurrence numbers, each cumulative occurrence number set being obtained by adding together the occurrence number sets corresponding to the operations of the operation set, which when applied to a same value or equivalent value of the possible values of the part of the data to be discovered, provide one of the partial operation results having a same transformed value resulting from an application of a second surjective function; and
- analyze the cumulative occurrence number sets to determine the part of the data to be discovered, in which, if the data to be discovered has leaked into the plurality of value sets, the part of the data to be discovered is in the cumulative occurrence number sets corresponding to the value of the part of the data to be discovered.

* * * * *